United States Patent
Nakade et al.

(10) Patent No.: US 12,130,963 B2
(45) Date of Patent: Oct. 29, 2024

(54) VIDEO DISPLAY APPARATUS AND METHOD

(71) Applicant: MAXELL, LTD., Kyoto (JP)

(72) Inventors: Mayumi Nakade, Kyoto (JP); Yasunobu Hashimoto, Kyoto (JP); Tamotsu Ito, Kyoto (JP); Kazuhiko Yoshizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/466,502

(22) Filed: Sep. 13, 2023

(65) Prior Publication Data

US 2023/0418376 A1 Dec. 28, 2023

Related U.S. Application Data

(63) Continuation of application No. 17/944,482, filed on Sep. 14, 2022, now Pat. No. 11,803,240, which is a
(Continued)

(51) Int. Cl.
*G06F 3/01* (2006.01)
*G06F 3/0482* (2013.01)
(Continued)

(52) U.S. Cl.
CPC ............... *G06F 3/013* (2013.01); *G06T 3/40* (2013.01); *G06T 11/60* (2013.01); *G06F 3/0482* (2013.01); *G06T 2200/24* (2013.01)

(58) Field of Classification Search
CPC ...................................... G06F 3/013
See application file for complete search history.

(56) References Cited

U.S. PATENT DOCUMENTS

2010/0171709 A1 7/2010 Toyokawa
2013/0335303 A1 12/2013 Maciocci et al.
(Continued)

FOREIGN PATENT DOCUMENTS

JP 2010-160564 A 7/2010
JP 2015-156087 A 8/2015
(Continued)

OTHER PUBLICATIONS

Notice of Reasons for Refusal dated May 7, 2024 issued in the corresponding Japanese Patent Application No. 2023-173414 with English translation.
(Continued)

*Primary Examiner* — Shivang I Patel
(74) *Attorney, Agent, or Firm* — Rimon P.C.

(57) ABSTRACT

With respect to a video display apparatus, a technology capable of improving the operability and usability for a user in relation to a generated image such as AR (Augmented Reality) is provided. An HMD as a video display apparatus displays an AR image on a display screen, configures an ID image including identification information (ID) for supporting an operation of a user to the AR image, detects a sight line direction of the user to set a sight line region, and displays the ID image so as to be associated with the AR image when the AR image falls within a range of the sight line region. The HMD receives an operation to select the ID image from the user, selects the AR image associated with the ID image when receiving the operation to select the ID image, and executes a predetermined process associated with the AR image.

7 Claims, 25 Drawing Sheets

2: DISPLAY SCREEN
3: SPEAKER
4: SIGHT LINE DETECTOR
5: CAMERA

Related U.S. Application Data continuation of application No. 17/297,575, filed as application No. PCT/JP2018/044066 on Nov. 29, 2018, now Pat. No. 11,487,359.

(51) Int. Cl.
*G06T 3/40* (2024.01)
*G06T 11/60* (2006.01)

(56) References Cited

U.S. PATENT DOCUMENTS

| | | |
|---|---|---|
| 2014/0368533 A1 | 12/2014 | Salter et al. |
| 2015/0338652 A1 | 11/2015 | Lim et al. |
| 2015/0363974 A1 | 12/2015 | Nakai et al. |
| 2016/0196603 A1 | 7/2016 | Perez et al. |
| 2016/0342388 A1* | 11/2016 | Imamura ................ G06F 3/011 |
| 2017/0289533 A1 | 10/2017 | Ono |
| 2018/0136465 A1 | 5/2018 | Chi et al. |
| 2018/0285642 A1* | 10/2018 | Nishimura ............ G01J 3/0264 |
| 2020/0090375 A1 | 3/2020 | Mori et al. |

FOREIGN PATENT DOCUMENTS

| | | |
|---|---|---|
| JP | 2016-004340 A | 1/2016 |
| JP | 2016-197461 A | 11/2016 |
| JP | 2016-218868 A | 12/2016 |
| JP | 2017-182413 A | 10/2017 |
| JP | 2018-170554 A | 11/2018 |
| WO | 2018/167966 A1 | 9/2018 |

OTHER PUBLICATIONS

Office Action issued in corresponding U.S. Appl. No. 17/944,482, dated Feb. 16, 2023.
Notice of Allowance issued in corresponding U.S. Appl. No. 17/944,482, dated Jun. 14, 2023.
Notice of Allowance issued in corresponding U.S. Appl. No. 17/297,575, dated Jul. 8, 2022.
International Search Report issued in corresponding International Patent Application No. PCT/JP2018/044066, dated Jan. 15, 2019, with English translation.
Extended European Search Report issued in the corresponding European application No. 18941206.7 dated Jun. 9, 2022 (13 pages).
Notice of Reasons for Refusal issued in corresponding Japanese Patent Application No. 2022-080185, dated Apr. 25, 2023, with English translation.

* cited by examiner

2: DISPLAY SCREEN
3: SPEAKER
4: SIGHT LINE DETECTOR
5: CAMERA

FIG. 8

MANAGEMENT TABLE

| MANAGEMENT ID | AR OBJECT (AR IMAGE) | DISPLAY POSITION | BASE POSITION | IDENTIFICATION INFORMATION (ID, ID IMAGE) | |
|---|---|---|---|---|---|
| A01 | ♥ | $(x_1, y_1)$ | $(X_1, Y_1, Z_1)$ | 1 | 1 |
| A02 | ★ | $(x_2, y_2)$ | $(X_2, Y_2, Z_2)$ | 2 | 2 |
| A03 | ♦ | $(x_3, y_3)$ | $(X_3, Y_3, Z_3)$ | 3 | 3 |
| ...... | ...... | ...... | ...... | ...... | |
| A11 | STORE A | $(x_{11}, y_{11})$ | $(X_{11}, Y_{11}, Z_{11})$ | NO IMAGE(0) | |
| ...... | ...... | ...... | ...... | ...... | |

FIG. 9

COMMAND TABLE

| COMMAND ID | TARGET (TYPE) | COMMAND | AUDIO (EXAMPLE) | NOTE (PROCESS CONTENT) |
|---|---|---|---|---|
| C01 | SIGHT LINE | SIGHT LINE REGION DISPLAY ON | SIGHT LINE ON | DISPLAY OF SIGHT LINE REGION |
| C02 | SIGHT LINE | SIGHT LINE REGION DISPLAY OFF | SIGHT LINE OFF | HIDING OF SIGHT LINE REGION |
| C03 | SIGHT LINE | SIGHT LINE REGION FIXATION | SIGHT LINE FIXATION | FIXATION OF SIGHT LINE REGION |
| C04 | SIGHT LINE | SIGHT LINE REGION FIXATION RELEASE | SIGHT LINE RELEASE | RELEASE OF FIXATION OF SIGHT LINE REGION |
| C05 | SIGHT LINE | SIGHT LINE REGION ENLARGEMENT | SIGHT LINE ENLARGEMENT | ENLARGEMENT OF SIGHT LINE REGION |
| C06 | SIGHT LINE | SIGHT LINE REGION REDUCTION | SIGHT LINE REDUCTION | REDUCTION OF SIGHT LINE REGION |
| ...... | ...... | ...... | ...... | ...... |
| C11 | ID | ID DISPLAY ON | IDENTIFICATION ON | DISPLAY OF ID IMAGE ON DISPLAY SCREEN |
| C12 | ID | ID DISPLAY OFF | IDENTIFICATION OFF | HIDING OF ID IMAGE ON DISPLAY SCREEN |
| ...... | ...... | ...... | ...... | ...... |
| C21 | ID | ID 1 SELECTION | NUMBER ONE | SELECTION OF ID IMAGE "1" |
| C22 | ID | ID 2 SELECTION | NUMBER TWO | SELECTION OF ID IMAGE "2" |
| ...... | ...... | ...... | ...... | ...... |
| C29 | ID | ID 9 SELECTION | NUMBER NINE | SELECTION OF ID IMAGE "9" |
| ...... | ...... | ...... | ...... | ...... |
| C30 | ID | ALL ID SELECTION | ALL | SELECTION OF ALL IDs IN SIGHT LINE REGION |
| C31 | ID | ONE ID SELECTION | SELECTION | SELECTION OF ONE ID IN SIGHT LINE REGION |
| C32 | ID | ALL ID SELECTION RELEASE | ALL RELEASE | RELEASE OF SELECTION OF ALL IDs IN SIGHT LINE REGION |
| C33 | ID | ONE ID SELECTION RELEASE | SELECTION RELEASE | RELEASE OF SELECTION OF ONE ID IN SIGHT LINE REGION |
| C34 | ID | ID EXECUTION | EXECUTION | EXECUTION OF PROCESS FOR CORRESPONDING AR IMAGE |
| ...... | ...... | ...... | ...... | ...... |
| C41 | ID | AR INFORMATION DISPLAY | INFORMATION ON | DISPLAY OF AR INFORMATION ASSOCIATED WITH SELECTED ID |
| C42 | ID | AR INFORMATION HIDING | INFORMATION OFF | HIDING OF AR INFORMATION ASSOCIATED WITH SELECTED ID |
| ...... | ...... | ...... | ...... | ...... |

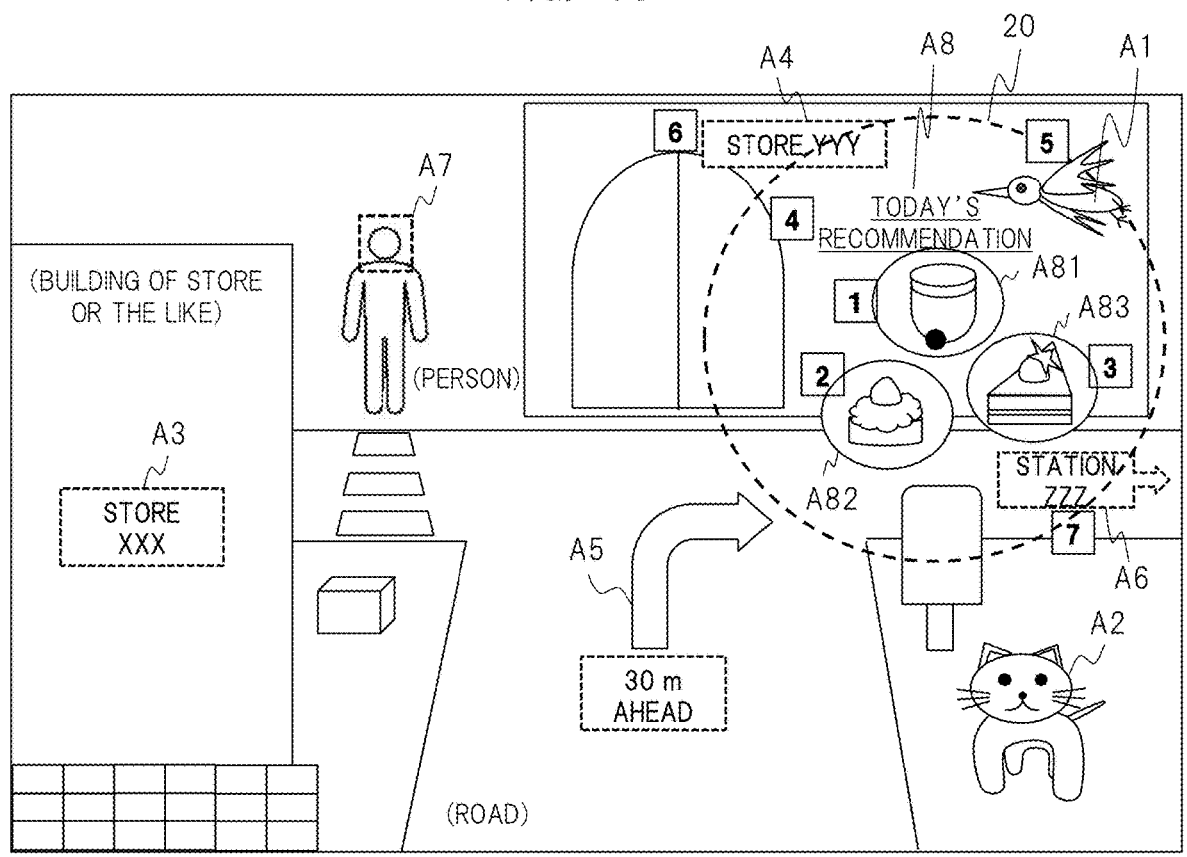

A21–A28: AR IMAGE (AR OBJECT)    [1] ······ [7] :ID IMAGE

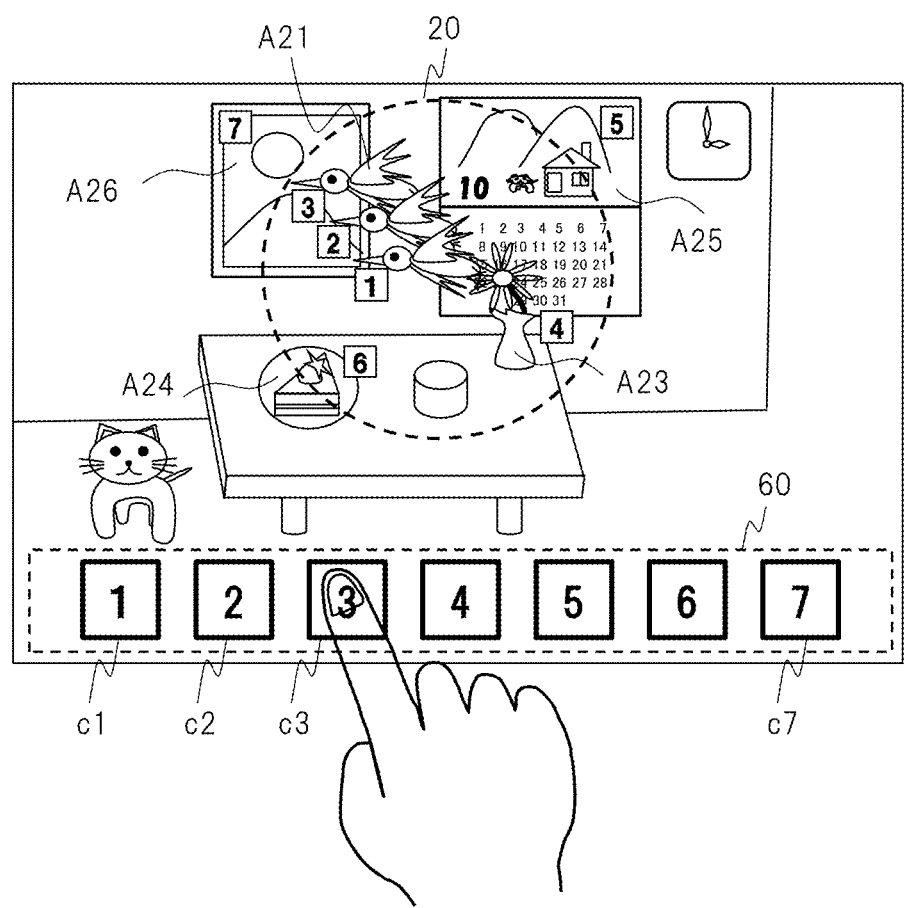

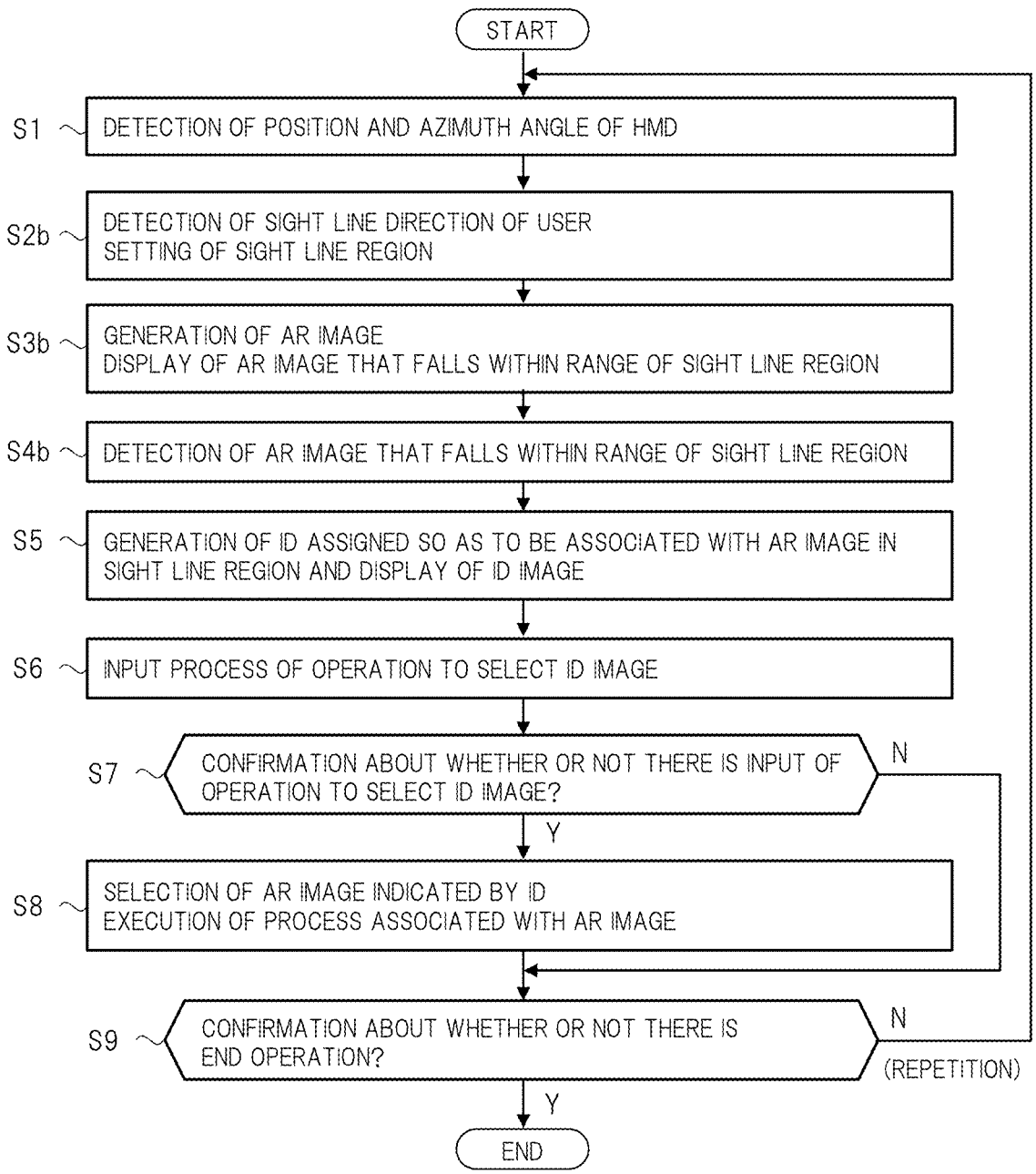

VIRTUAL MOVEMENT
OF OBJECT

VIDEO DISPLAY APPARATUS AND METHOD

RELATED APPLICATIONS

This application is a Continuation of U.S. patent application Ser. No. 17/944,482, filed Sep. 14, 2022, which is a Continuation of U.S. patent application Ser. No. 17/297,575, filed May 27, 2021, now U.S. Pat. No. 11,487,359 issued Nov. 1, 2022, which is the U.S. National Phase under 35 U.S.C. § 371 of International Application No. PCT/JP2018/044066, filed on Nov. 29, 2018, the entire contents is hereby incorporated by reference.

TECHNICAL FIELD

The present invention relates to a technology of a video display apparatus and relates to a technology for displaying a computer-generated image (sometimes referred to as a virtual image) on a video of the real space (sometimes referred to as a real image).

BACKGROUND ART

Development of the technology for displaying generated images such as augmented reality (AR), virtual reality (VR), and mixed reality (MR) on an object of a real image has been in progress. The generated images include a still image and a moving image. Examples of the video display apparatus capable of displaying the generated image include a head mounted display (HMD) and a head up display (HUD). For example, an HMD having an AR function displays an AR image (referred to also as an AR object or the like), which is the generated image, so as to be superimposed over a real image on a transparent or non-transparent display screen. The user performs an operation to select a target AR image from a plurality of AR images on the display screen. The HMD performs a predetermined process associated with the selected AR image.

As an example of the prior art technology related to the above-mentioned video display apparatus, Japanese Unexamined Patent Application Publication No. 2016-218868 (Patent Document 1) can be given. Patent Document 1 describes that the selectability of displayed object data is improved in a display control method or the like. Patent Document 1 describes that the HMD generates a number of identification information corresponding to the number of selectable object data contained in the display range of the display, and displays each of the generated identification information so as to be associated with each of the object data contained in the display range. Namely, Patent Document 1 describes that the image (referred to also as an ID image) of identification information (referred to also as an ID) is assigned and displayed to the AR image as shown in FIG. 2 and the like. It can be said that this ID image is also a kind of the AR image.

RELATED ART DOCUMENTS

Patent Documents

Patent Document 1: Japanese Unexamined Patent Application publication No. 2016-218868

SUMMARY OF THE INVENTION

Problems to be Solved by the Invention

In a video display apparatus such as an HMD of the prior art technology, it is difficult for the user to select a desired AR image when, for example, there are a large number of objects and a large number of AR images on the display screen. Further, the method for selecting an AR image in the prior art technology is, for example, a method based on the detection of a gesture of fingers by the use of a camera. Examples of the gesture include an operation of virtually touching or pinching a target AR image with fingers. However, it is sometimes difficult to detect the operation to select the AR image in this method.

The video display apparatus of the prior art technology has the room for improvement in terms of operability and usability for the user in relation to the generated images such as AR. An object of the present invention is to provide a technology capable of improving the operability and usability for a user in relation to a generated image such as AR with respect to the technology of a video display apparatus. Problems, configurations, effects, and the like other than the above will be described in the embodiments of the present invention.

Means for Solving the Problems

A typical embodiment of the present invention has the following configuration. A video display apparatus according to one embodiment is a video display apparatus which displays a generated image so as to be superimposed on a real image, and the video display apparatus displays the generated image on a display screen, configures an ID image including identification information for supporting an operation of a user to the generated image, detects a sight line direction of the user to set a sight line region in accordance with the sight line direction, displays the ID image so as to be associated with the generated image when the generated image falls within a range of the sight line region, receives an operation to select the ID image from the user, selects the generated image associated with the ID image when receiving the operation to select the ID image, and executes a predetermined process associated with the generated image.

Effects of the Invention

According to the typical embodiment of the present invention, it is possible to improve the operability and usability for a user in relation to a generated image such as AR with respect to the technology of a video display apparatus.

BRIEF DESCRIPTIONS OF THE DRAWINGS

FIG. 8 is a diagram showing a configuration example of a management table in the video display apparatus according to the first embodiment;

FIG. 9 is a diagram showing a command table of an audio input in the video display apparatus according to the first embodiment;

FIG. 10 is a diagram showing a first example of a real image, an AR image, and an ID image in the video display apparatus according to the first embodiment;

FIG. 22 is a diagram showing an example of a video in a video display apparatus according to the second embodiment of the present invention;

FIG. 27 is a diagram showing a process flow in a video display apparatus according to the third embodiment of the present invention;

DETAILED DESCRIPTION OF PREFERRED EMBODIMENT

Hereinafter, embodiments of the present invention will be described in detail with reference to drawings. Note that the same components are denoted by the same reference signs in principle throughout the drawings for describing the embodiments, and the repetitive description thereof will be omitted.

First Embodiment

A video display apparatus according to the first embodiment of the present invention will be described with reference to FIG. 1 to FIG. 21B. The case where the present invention is applied to an HMD is shown as the video display apparatus according to the first embodiment. The case of the transparent HMD is shown as a type of the HMD, but the same applies to other cases such as the non-transparent HMD.

[HMD (1)]

Figure 1:
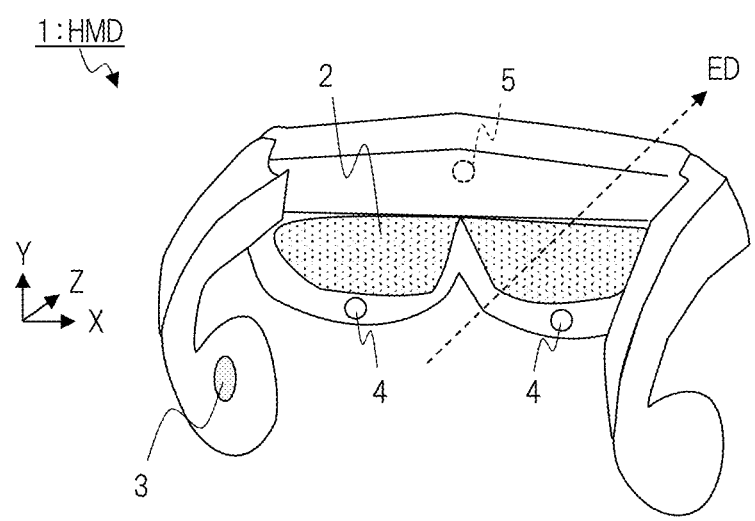
FIG. 1 is a diagram showing an external appearance of an HMD which is a video display apparatus according to the first embodiment of the present invention.

FIG. 1 shows an external appearance of an HMD 1 which is the video display apparatus according to the first embodiment. The HMD 1 includes a display screen 2, a speaker 3, a sight line detector 4, a camera 5, a microphone (not shown), and the like in a head-mounted housing. A control unit and a display unit are incorporated in the housing of the HMD 1. The control unit is composed of an integrated circuit and the like, and controls the entire HMD 1 including the display unit. The display unit includes the display screen 2 and displays a video on the display screen 2. The display screen 2 is a region where the user can visually recognize the video. The display screen 2 is, for example, a spectacle-shaped display element arranged in front of both eyes of the user, that is, a transparent display screen. Namely, the HMD 1 is a transparent HMD. The control unit controls the display of the video including the AR image on the display screen 2. The display unit is composed of, for example, a projection display device, and includes a light source, an optical system such as a lens, a driving circuit, and the like. In the case of the transparent HMD, the frontward real image is seen from the user's eyes through the display screen 2, and a generated image such as the AR image is displayed so as to be superimposed on the real image. When a non-transparent HMD is used in another embodiment, the display unit including the display screen 2 is composed of, for example, a liquid crystal display element. In this case, a video obtained by synthesizing the generated image with the frontward video taken by the camera 5 is displayed on the display screen 2. As the video display method on the display screen 2, for example, a projection display method can be applied, but the video display method is not particularly limited.

The speaker 3 emits audio in accordance with the control from the control unit. The microphone receives the audio input from the user and sends it to the control unit. The control unit performs audio recognition process from the input audio of the microphone and detects a predetermined command or the like specified in advance.

The control unit performs a predetermined process specified in advance in accordance with the detected command. Consequently, various functions including the AR control can be realized. A dictionary of audio commands (command table described later) is provided in the memory of the HMD 1 in advance, and various commands are registered therein. The HMD 1 of the first embodiment can perform the operation to select an ID image of an AR image and the operation for a sight line region by the use of the audio command.

The sight line detector 4 detects the state of the sight line of both eyes of the user, at least the sight line direction. The sight line detector 4 may also detect other states such as blinking of the eyes. The control unit cooperates with the sight line detector 4 to constantly grasp the sight line direction of the user. The camera 5 captures the front of the HMD 1 to obtain an image. The camera 5 may be a stereo camera or the like. The control unit processes the image of the camera 5 to detect an object or the like. The housing of the HMD 1 includes sensors such as a GPS receiver, an electronic compass, a gyro sensor, and an acceleration sensor. The HMD 1 uses these sensors to detect the position, orientation, acceleration, etc. of the HMD 1.

An operating device (in other words, a remote controller) may be connected to the HMD 1 of FIG. 1, in other words, the main device of the video display apparatus, through a wireless communication interface or a wired communication interface. The control unit cooperates with the operating device and receives an operation input from the operating device. In this case, the user can give a command to the main device by operating a button or the like of the operating device with a finger. The operating device is not limited to a dedicated device, and a general-purpose portable information terminal device such as a smartphone of the user may be applied. In this case, the user can operate the HMD 1 from the smartphone or the like. For example, an application or data for the AR may be installed in the smartphone of the user. In that case, the control unit of the HMD 1 cooperates with the application and data for the AR in the smartphone by communication.

[HMD (2)]

Figure 2:
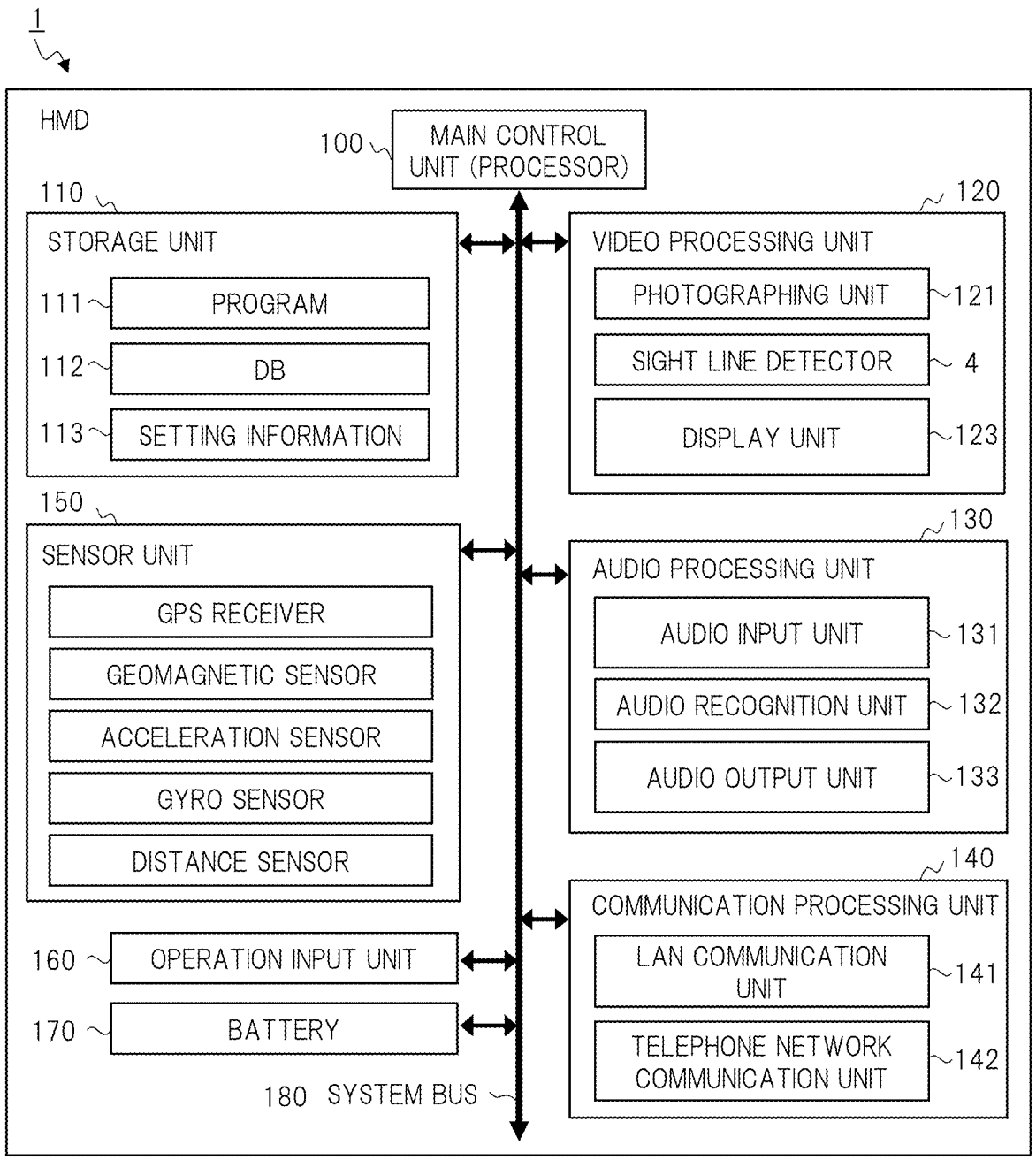
FIG. 2 is a diagram showing a functional block configuration of the video display apparatus according to the first embodiment.

FIG. 2 shows a functional block configuration of the HMD 1. The l1 includes a main control unit 100, a storage unit 110, a video processing unit 120, an audio processing unit 130, a communication processing unit 140, a sensor unit 150, an operation input unit 160, a battery 170, a system bus 180, and the like. Each unit transmits and receives commands and data via the system bus 180. The main control unit 100 is a processor composed of an MPU or the like, and controls the entire HMD 1 in accordance with a program 111 of the storage unit 110. The processor realizes a predetermined function or the like by reading the data of the program of the storage device into the memory for processing and then executing the process in accordance with the program.

The storage unit 110 is composed of a non-volatile storage device such as a flash ROM or SSD. The storage unit 110 stores data and information such as the operation control program 111, DB 112, and setting information 113. The program 111 includes a program that realizes the OS of the HMD 1, a program that realizes the AR function, a program that realizes the support function, and the like.

The DB 112 is a database that stores various data such as content data of AR images, data of ID images for support, and management information, and includes data with a data structure such as a file, a table, or a list. The setting information 113 includes system setting information and user setting information. The storage unit 110 includes a work area for processing. In addition, the storage unit 110 also stores, for example, an AR program, video and audio content data, and other various types of information acquired from the communication network and the external device. Examples of the various types of information include search information related to objects on a map. Further, the storage unit 110 stores video data and the like taken by the camera 5. Other than these, various data and programs may be stored in an external server device or the like linked to the HMD 1.

The sensor unit 150 includes various sensors for detecting the state of the HMD 1 and its vicinity. The sensor unit 150 includes, for example, a GPS receiver, a geomagnetic sensor (electronic compass), an acceleration sensor, a gyro sensor, a distance sensor, and the like. The HMD 1 can detect the position (for example, latitude, longitude, altitude), orientation (for example, azimuth angle and elevation angle), inclination, movement such as acceleration, distance to an object, etc. of the HMD 1 by these sensors. The sensor unit 150 may include other sensors such as an illuminance sensor, a proximity sensor, and a barometric pressure sensor.

The communication processing unit 140 is composed of an IC chip or the like, and includes a communication processing circuit, an antenna, and the like. The communication processing unit 140 includes a LAN communication unit 141, a telephone network communication unit 142, and the like. The LAN communication unit 141 performs data communication processing with the LAN via an access point by a system such as Wi-Fi (registered trademark). The telephone network communication unit 142 enables telephone and data communication by performing wireless communication processing with a base station of a mobile telephone communication network by a system such as W-CDMA (registered trademark), GSM, or LTE. The communication processing unit 140 may also include a communication unit of a system such as Bluetooth (registered trademark) or infrared rays.

The video processing unit 120 is composed of an IC chip or the like, and includes a photographing unit 121, a sight line detector 4, a display unit 123, and the like. The photographing unit 121 includes the camera 5. The display unit 123 includes the display screen 2. The camera 5 of the photographing unit 121 obtains image data by converting the light input from the lens into an electric signal by the use of an element such as a CCD or a CMOS. A known method can be applied to the sight line detection method of the sight line detector 4. Examples of the method include a method in which the inner corner of the eye and the iris are captured with a visible camera to detect the sight line, a method in which the sight line is detected using a corneal reflection method by an infrared LED and an infrared camera, and the like. The display unit 123 includes a video processing circuit, a video RAM, and the like, and displays the AR image so as to be superimposed on the display screen 2 based on the video data input to the video RAM. A touch panel or the like may be further applied to the display unit 123.

The audio processing unit 130 is composed of an IC chip or the like, and includes an audio input unit 131, an audio recognition unit 132, and an audio output unit 133. The audio input unit 131 includes a microphone and converts the input audio into audio data. The audio output unit 133 includes the speaker 3, and converts the audio data into audio and outputs the audio. The audio recognition unit 132 analyzes the input audio data and detects a command or the like. The audio recognition unit 132 may be configured of a dedicated IC, or may be configured by a program processing by the main control unit 100.

The operation input unit 160 is a part that receives basic operation inputs to the HMD 1 (for example, power ON/OFF, volume adjustment, etc.), and includes, for example, a hardware button, a touch sensor, and the like. The HMD 1 can operate by the use of the power of the battery 180 even when power is not supplied from the outside.

[Process Flow (1)]

Figure 3:
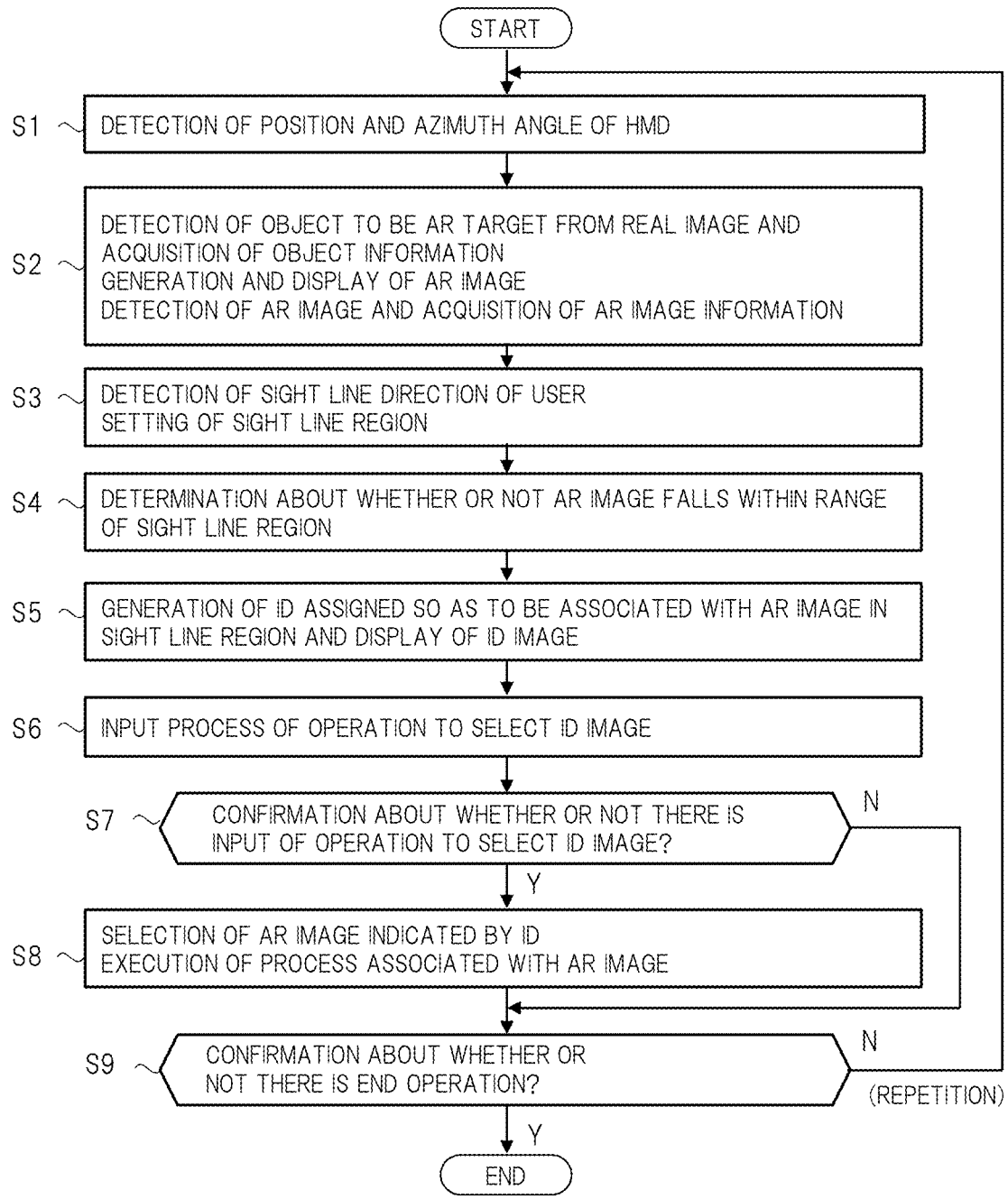
FIG. 3 is a diagram showing a main process flow in the video display apparatus according to the first embodiment.

FIG. 3 shows a main process flow in the HMD 1. The flow in FIG. 3 includes steps S1 to S9. Hereinafter, the flow will be described in order of steps. The processor takes a primary role in the main process.

In step S1, the HMD 1 detects the position and orientation of the HMD 1. The position of the HMD 1 is, for example, a position in a three-dimensional geographical space, and can be obtained as coordinates (latitude, longitude, altitude) by the use of a GPS receiver or the like. The orientation of the HMD 1 corresponds to the direction of looking forward of the display screen 2 (Z direction) of FIG. 1, and can be obtained as an azimuth angle and an elevation angle by the use of an electronic compass. In addition, the HMD 1 detects the current state by the use of the sensor unit 150.

In step S2, the HMD 1 (for example, an AR program) generates and displays an AR image by a predetermined method. For example, the HMD 1 detects a predetermined object to be an AR target from the real image of the display screen 2. For example, the HMD 1 detects the three-dimensional position of the object and the distance from the HMD 1 by using the camera 5 or the like, and detects the two-dimensional position and the image region of the object on the display screen 2. The HMD 1 acquires object information about the detected object. For example, the HMD 1 may search for object information corresponding to the position of the object from map data or the Internet. Alternatively, the HMD 1 may acquire information of an object existing in the vicinity of the current position from the map data based on the current position of the HMD 1. The HMD 1 may acquire information of an object such as a store on a map by using a service, for example, Google Street View or the like.

The HMD 1 generates an AR image based on the acquired object information and displays it on the display screen 2. For example, the AR program of the HMD 1 displays the AR image so as to be associated with the position and the image region of the object on the display screen 2.

The HMD 1 detects the AR image generated and displayed by the AR program, and acquires information about the AR image. The HMD 1 may refer to the information of the AR object stored in the DB 112 (management table described later), or may acquire the information of the AR object from the Internet.

In step S3, the HMD 1 detects a user's sight line direction such as a sight line direction ED in FIG. 1 in real time by the use of the sight line detector 4. The HMD 1 sets a sight line region (FIG. 6 described later) in accordance with the detected sight line direction on the display screen 2. The sight line region is set as, for example, a circular region having a predetermined radius with a point at which the sight line direction and the display screen 2 intersect as a center point. The HMD 1 of the first embodiment has a configuration in which the sight line region is not displayed on the display screen 2 in the basic setting, but may have a configuration in which the sight line region is displayed on the display screen 2 in the basic setting. Alternatively, the HMD 1 of the first embodiment can switch between display and hide of the sight line region in accordance with the operation of the user (command described later). The position or the like of the sight line region is updated at each control timing. If the movement of the sight line is small, the same sight line region as the previous time is used.

In addition, the HMD 1 determines whether or not the sight line region deviates from the display screen 2 within the process of step S3. The HMD 1 executes a predetermined process when the sight line region has deviated. This process includes, for example, a process of reconstruction related to an ID image in the sight line region. Further, at the start of the use of the HMD 1, the sight line region in the initial setting is used.

In step S4, the HMD 1 makes a determination about the positional relationship between the AR image of step S2 and the sight line region of step S3 on the display screen 2. Namely, the HMD 1 determines whether or not the position or region of the AR image is contained in and overlapped with the sight line region at that time. For example, the HMD 1 determines whether the "display position" of the "AR image" in the management table (FIG. 8) described later falls within the range of the sight line region at that time.

In step S5, the HMD 1 generates an ID image assigned so as to be associated with the corresponding AR image in the sight line region, and displays the ID image at the position corresponding to the AR image on the display screen 2. This ID image indicates that the selection operation for the corresponding AR image is possible. At this time, when there are one or more AR images in the sight line region, the HMD 1 sequentially assigns ID numbers (for example, 1, 2, 3, . . . ) to them. Then, the HMD 1 generates the ID image having that ID and displays it at the position near the AR image.

As described above, the HMD 1 of the first embodiment displays the ID image for the AR image within the sight line region in a limited manner, and does not display the ID image for the AR image outside the sight line region. Note that the HMD 1 may internally prepare the ID and the ID image for the AR image outside the sight line region, but does not display the AR image. The AR image for which the selection operation is possible is the AR image which is in the sight line region and to which the ID image is assigned. As described above, since the number of ID images displayed on the display screen 2 can be reduced and the amount of information can be reduced, the user can easily select the ID image (corresponding AR image).

In step S6, the HMD 1 receives the user's operation input. The HMD 1 specifically receives the input of the selection operation related to the ID image. The HMD 1 of the first embodiment receives at least the operation to select the ID image by the input of the audio recognition command.

In step S7, the HMD 1 confirms whether or not the operation input to select the ID image in step S6 has been performed, and if the operation input to select the ID image has been performed (Y), the flow proceeds to step S8, and if not (N), the flow proceeds to step S9.

In step S8, the HMD 1 selects the AR image indicated by the ID of the selected ID image (in other words, puts it into the selected state), and executes a predetermined process associated with the AR image by the corresponding AR program.

In step S9, the HMD 1 confirms whether or not a predetermined end operation related to the AR function and the support function has been performed, and if the end operation has been performed (Y), the flow is ended. If the end operation has not been performed (N), the flow returns to the initial step S1 and the same process is repeated.

In the repetition of the loop of the above flow, the HMD 1 may determine whether the change in the position, orientation, etc. of the HMD 1 is equal to or more than a predetermined degree in step S1, and the subsequent update process (for example, update of the sight line region or the ID image) may be executed if the change is equal to or more than the predetermined degree. Similarly, the HMD 1 may determine whether the change in the sight line direction is equal to or more than a predetermined degree in step S3, and the subsequent update process may be executed if the change is equal to or more than the predetermined degree. Further, the HMD 1 may use a set threshold value when determining the change in the sight line region and the like. For example, when the angle representing the sight line direction is equal to or greater than a set threshold angle (for example, 10 degrees), the HMD 1 determines that the sight line direction has changed and performs the update process. Alternatively, the HMD 1 may determine that the sight line direction has changed when the angle representing the sight line direction has continuously changed for a predetermined threshold time (for example, 1 second) or more. Further, for example, when the difference in the position of the HMD 1 between time points is equal to or more than a set threshold distance (for example, 0.1 m), the HMD 1 determines that the position of the HMD 1 has changed and performs the update process. When the sight line region and the like are not changed or the change is small, the HMD 1 continues to use the previously set sight line region and the like.

[Process Flow (2)]

Figure 4:
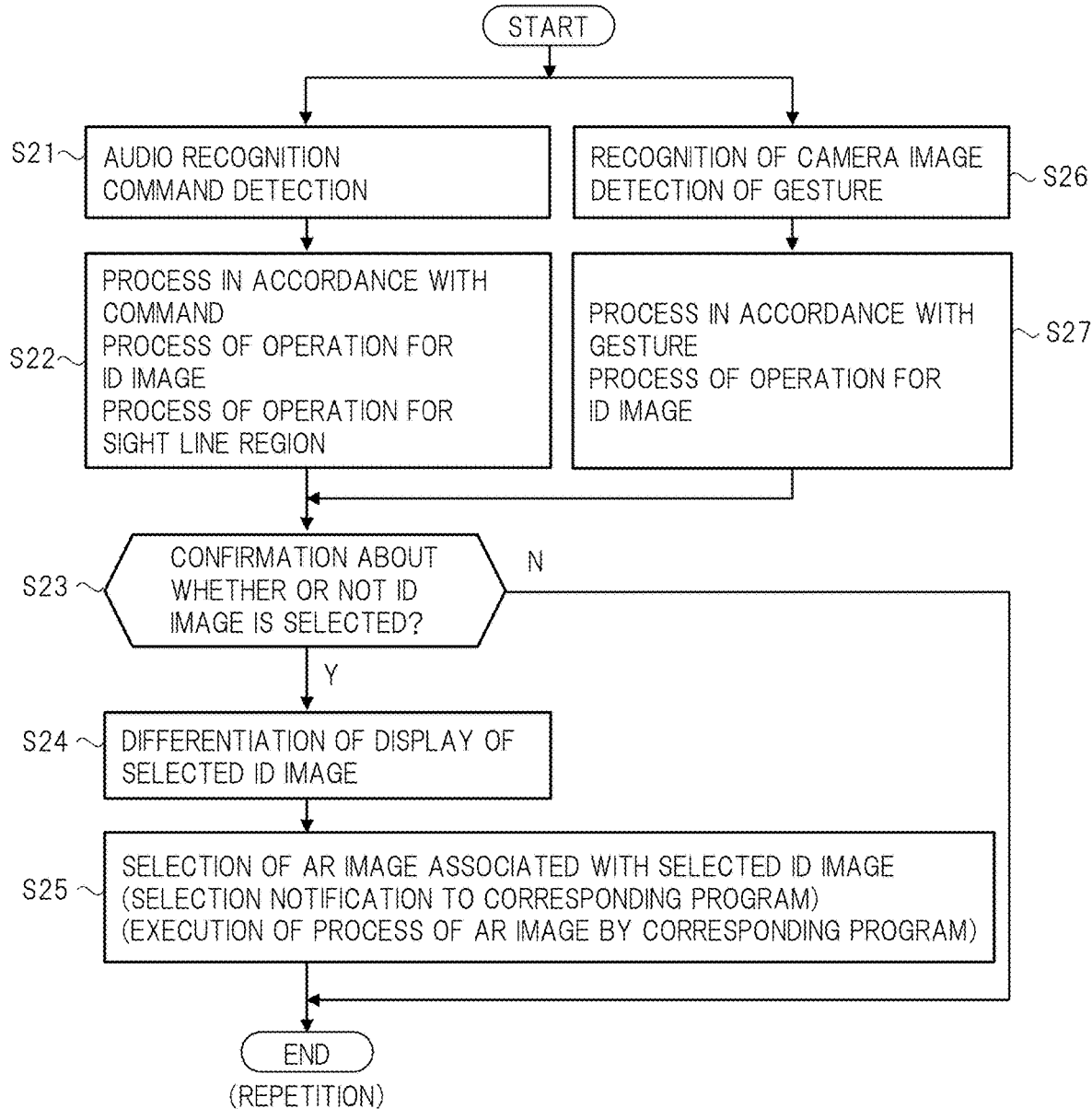
FIG. 4 is a diagram showing a process flow related to an ID image in the video display apparatus according to the first embodiment.

FIG. 4 shows a process flow related to the process of the ID image in steps S6 to S8 in detail. FIG. 4 includes steps S21 to S27. In step S21, the HMD 1 detects a predetermined command based on audio recognition. The HMD 1 performs the process in accordance with the command table (FIG. 9) described later. In step S22, the HMD 1 performs the process of a predetermined function corresponding to the detected command. Examples of the command include a command related to the operation for the sight line region, a command related to the operation for the ID image, and the like, and a corresponding process is defined for each command.

In step S23, the HMD 1 confirms whether or not the ID image is selected, and ends the flow when it is not selected (N). When it is selected (Y), the flow proceeds to step S24. In step S24, the HMD 1 differentiates the display state of the selected ID image on the display screen 2. Namely, the HMD 1 displays the ID image on the display screen 2 with a predetermined display effect (for example, blinking display, high-luminance display, specific color display, etc.). As a result, the user is informed of which ID image is in the selected state and the like.

Figure 5:
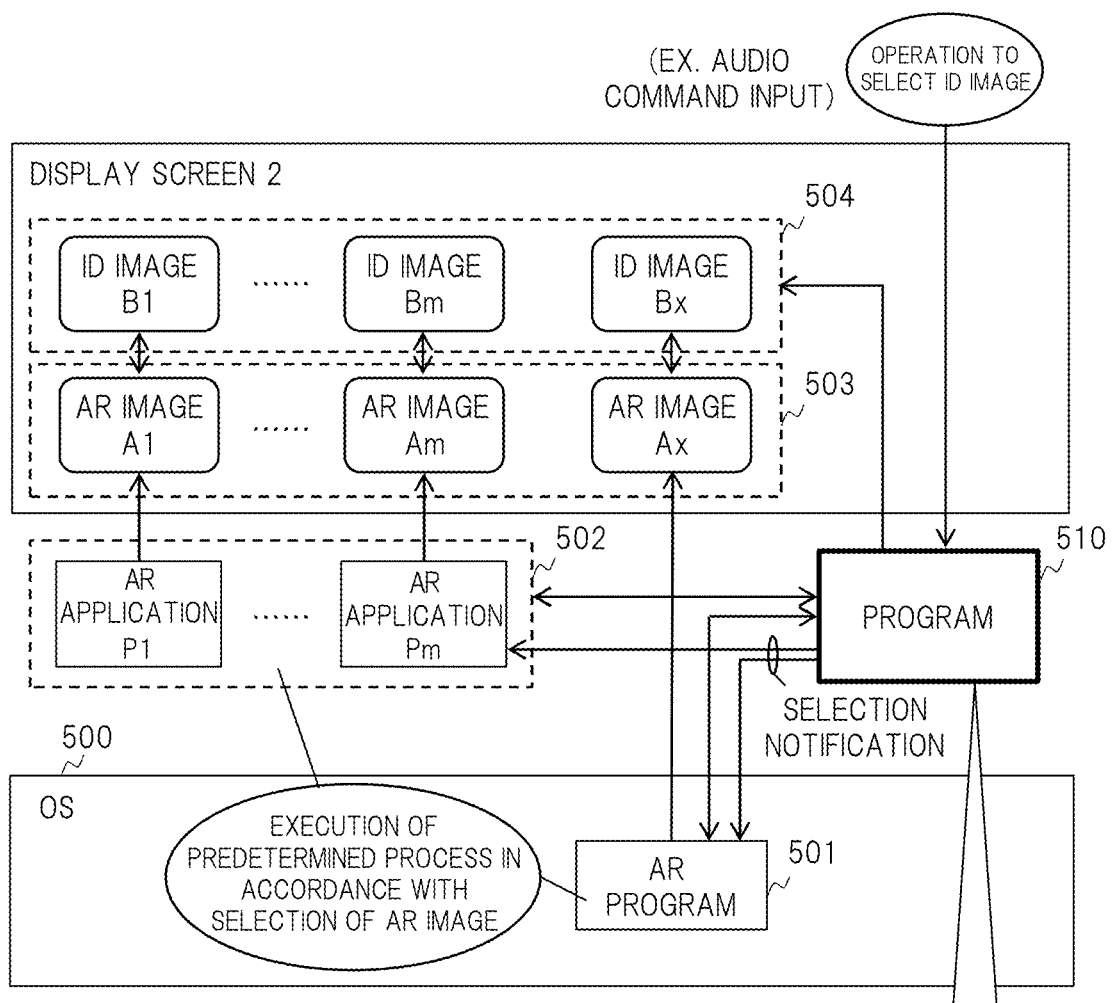
FIG. 5 is a diagram showing a software configuration example in the video display apparatus according to the first embodiment.

In step S25, the HMD 1 selects the AR image associated with the selected ID image. For example, the HMD 1 transmits a selection notification to the AR program associated with the selected AR image (FIG. 5 described later). Consequently, the AR program that has received the selection notification puts the AR image into the selected state and executes a predetermined process corresponding to the selection of the AR image. As an example, in the case of an AR application that provides information of a store or the like on a map, the AR application acquires detailed information of the store corresponding to the selected AR image and generates and displays the AR image indicative of the detailed information. As another example, in the case of an AR application with which the user can arbitrarily arrange an AR image in the real image, the AR application puts the AR image into the selected state, and performs the movement and deletion of the AR image and the instruction to the AR image in accordance with the operation of the user.

In the first embodiment, a gesture method can be used in combination as the operation input method. The flow of FIG. 4 shows a flow when this method is used in combination, and includes steps S26 and S27 corresponding thereto. In step S26, the HMD 1 acquires a frontward image taken by the use of the camera 5, and determines and detects a predetermined gesture from the image by image recognition process. The gesture to be detected is, for example, a touch gesture in which the user puts and stops his/her finger at the position of the ID image for a predetermined time or more in the region corresponding to the display screen 2. Alternatively, the other gesture to be detected is a gesture in which the user virtually pinches the ID image with his/her fingers.

In step S27, the HMD 1 performs a predetermined functional process in accordance with the detected gesture. This process includes at least an operation process to select an ID image in accordance with the predetermined gesture. After step S27, the flow proceeds to step S23, and it is similarly confirmed whether or not the ID image is selected.

[Software Configuration Example]

FIG. 5 shows a configuration example of the software of the HMD 1 according to the first embodiment. FIG. 5 shows an example in which a support function is implemented at the level of the OS or middleware of the HMD 1. The HMD 1 includes an OS 500, an AR program 501, an AR application 502, and a program 510. The OS 500 includes middleware and the like. The AR program 501 is a program included in the OS 500 and having a function of generating and displaying an AR image. The AR program 501 is, for example, a program that displays information such as the time, battery state, and communication state of the HMD 1 and icons of various functions on the display screen 2 as the AR image. In this example, the case where the AR program 501 generates an AR image Ax and displays it on the display screen 2 is shown.

The AR application 502 is various application programs actuated on the OS 500 and having a function of generating and displaying the AR image. The AR application 502 includes, for example, AR applications P1 to Pm as a plurality of AR applications. In this example, the case where each AR application 502 (P1 to Pm) generates each AR image A1 to Am and displays it on the display screen 2 is shown.

As a premise, the HMD 1 displays the AR images on the display screen 2 by the AR program 501 of the OS 500 and each AR application 502 as in this example. The AR program 501 and the AR application 502 each have a function of executing a predetermined process associated with the AR image.

Further, the HMD 1 of the first embodiment includes a program 510 in which the support function is implemented. The program 510 may be implemented as part of the OS 500 or at the level of one application. The main control unit 100 realizes the support function by executing the process in accordance with the program 510 on the OS 500. This support function is a support function for the operation of an AR image. Namely, this support function is a function that supports the selection operation or the like by the use of the ID image such that the selection operation or the like of a plurality of AR images by the AR program 501 and each AR application 502 can be easily performed. This support function is a function of assigning and displaying the ID image to the AR image in accordance with the sight line region.

This support function is a function that enables to select the AR image by the selection operation of the ID image.

The program 510 cooperates with the AR program 501 and each AR application 502. The program 510 generates an ID image 504 and displays it so as to be associated with an AR image 503 displayed on the display screen 2. As an example, the case where ID images B1 to Bm and an ID image Bx are displayed so as to be associated with AR images A1 to Am and an AR image Ax is shown.

The program 510 receives an input of the selection operation of the ID image 504 by the user (for example, audio command for designating an ID). The program 510 interprets the input of the selection operation as the selection of the ID image and the AR image. When the AR image 503 associated with the selected ID image 504 is selected, the program 510 sends a selection notification to the corresponding program (AR program 501 or AR application 502). The program that has received the selection notification puts the target AR image into the selected state and executes a predetermined process associated with the AR image.

As another embodiment, the support function of the program 510 may be implemented only in a specific application. In this case, the specific application performs the support related to the selection operation by displaying the ID image or the like only for the specific AR image which the application itself controls.

[ID Image Display]

Figure 6:
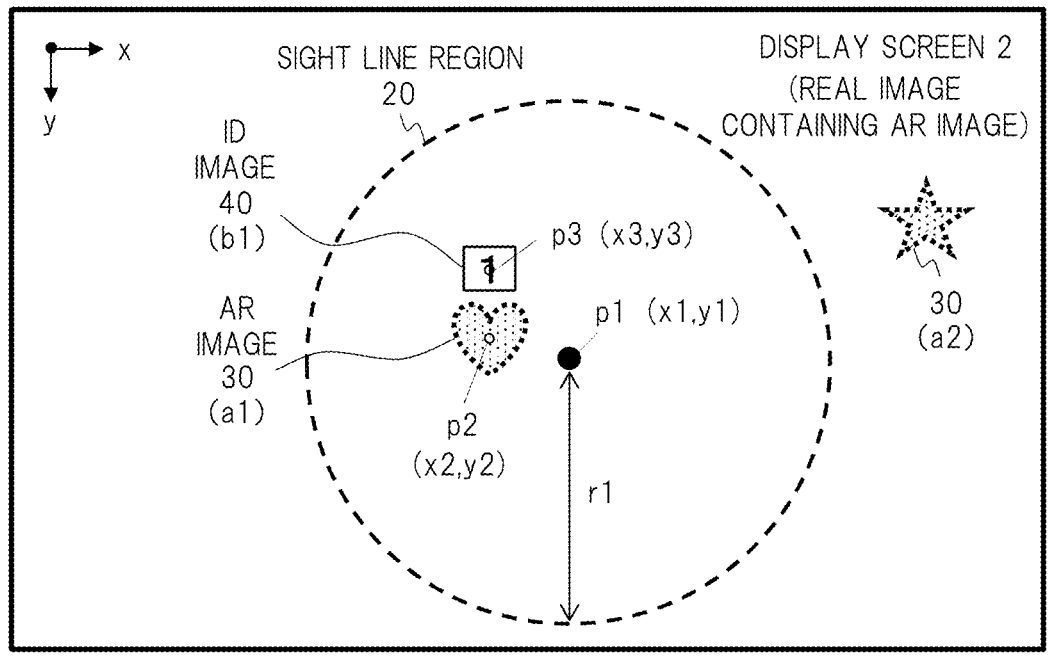
FIG. 6 is a diagram showing a basis of the display of the ID image in the video display apparatus according to the first embodiment.

FIG. 6 shows the basis of assignment and display of an ID image to the video including an AR image on the display screen 2. In FIG. 6, the rectangular frame schematically represents the display screen 2. The two-dimensional coordinate system of the display screen 2 is indicated by (x, y). The x direction is defined as the lateral direction and the in-plane horizontal direction, and the y direction is defined as the longitudinal direction and the in-plane vertical direction. One or more AR images 30 are displayed in some cases on the display screen 2 in accordance with an object (not shown) or a geographical position or independently of the object. In this example, an AR image a1 represented as a heart-shaped mark and an AR image a2 represented as a star-shaped mark are shown as AR images 30. The AR image a1 is displayed at a position p2 (x2, y2) on the display screen 2.

On the other hand, on the display screen 2, the sight line region 20 is set in accordance with the sight line direction of the user. The sight line region 20 is dynamically set in accordance with the change in the sight line direction. It is assumed that the point where the user's sight line direction and the display screen 2 intersect is, for example, a position p1 (x1, y1). In this case, a circular region having a predetermined radius r1 with the position p1 as the center point is set as the sight line region 20. The sight line region 20 is not displayed in the basic setting, but is illustrated by a broken line.

For example, the AR image 30 (a1) is contained in the sight line region 20. In this case, the HMD 1 generates an ID image 40 (b1) and displays the ID image 40 (b1) so as to be associated with the AR image 30 (a1). In this example, the ID image 40 has a rectangular ID image b1 with "1" as the ID number. The ID image b1 is, for example, an image in which the number "1" is arranged in a rectangular frame. Inside of the frame of the ID image b1 is, for example, a transparent region, but it may be a non-transparent region. In this example, the ID image b1 is displayed at a position p3 (x3, y3) near the position p2 of the AR image a1, for example, a position on an upper side of the AR image a1. Since the AR image a2 is not within the sight line region 20, the ID image 40 is not displayed for the AR image a2. The position where the ID image 40 is displayed with respect to the position of the AR image 30 is not limited to the position on the upper side, and a suitable vacant position is selected depending on the display state of the AR image and the ID image 40 on the display screen 2 at that time.

[Sight Line Region]

Figure 7:
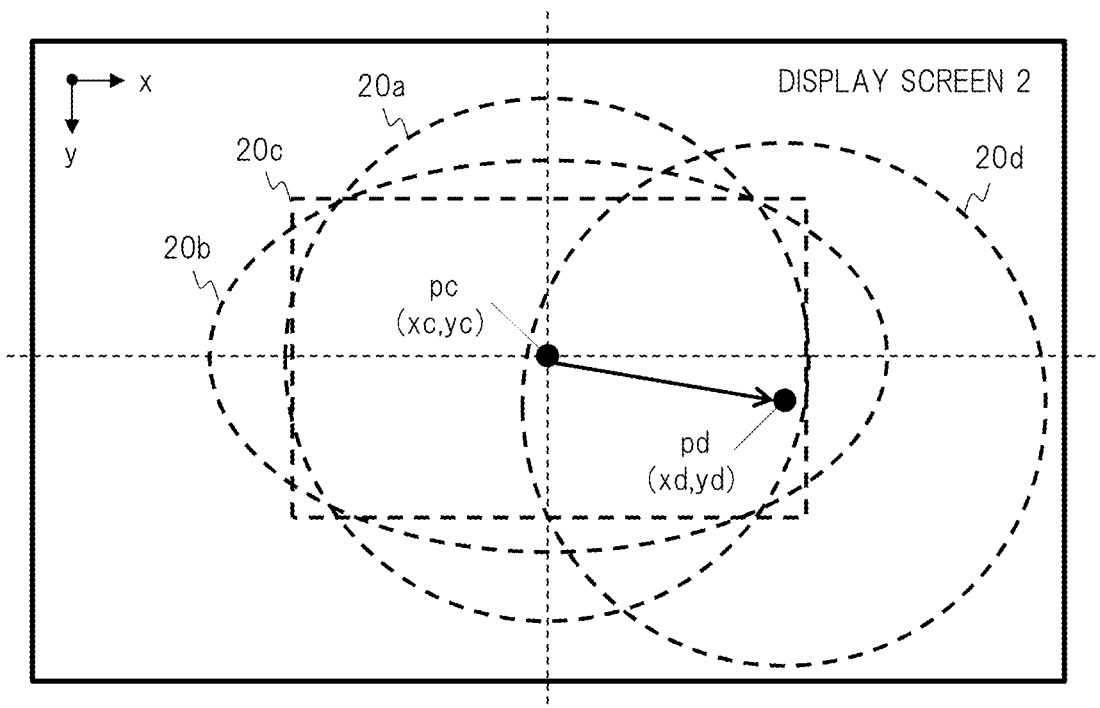
FIG. 7 is a diagram showing a configuration example of a sight line region in the video display apparatus according to the first embodiment.

FIG. 7 shows a configuration example of the sight line region 20. In FIG. 7, sight line regions 20a, 20b, and 20c are shown as examples of the sight line region 20. The sight line region 20a is an example having a circular shape as in FIG. 6. The shape of the sight line region 20 is not limited to this, and various shapes can be set. The sight line region 20b is an example having a horizontally long elliptical shape. The sight line region 20c is an example having a horizontally long rectangular shape. Further, the size of the sight line region 20 such as the radius may be a fixed size set in advance, or may be changed by user setting. For example, the vertical and horizontal widths of the sight line region may be user-configurable. Further, as will be described later, when the HMD 1 is used, the size of the sight line region 20 and the like can be changed in accordance with a predetermined operation input by the user.

Also, the sight line region 20a in this case is set at a position pc (xc, yc) at the center of the display screen 2. In the first embodiment, the position of the sight line region 20 changes in accordance with the sight line direction of the user. For example, when the position to which the sight line is directed changes from the position pc to a position pd (xd, yd), the sight line region 20a moves to a sight line region 20d.

As the HMD 1 according to a modification, the sight line region may be fixedly set at a preset fixed position on the display screen 2, for example, the center position pc (xc, yc), without depending on the sight line direction of the user. The vertical and horizontal broken lines passing through the position pc are bisectors of the vertical and horizontal widths of the display screen 2. This modification corresponds to a mode in which the sight line region 20 is controlled assuming that the user's sight line direction is substantially the same as the orientation of the HMD 1. In the case of this modification, the hardware and software configurations can be simplified. The user changes the orientation of the HMD 1 by moving the head. By this means, the sight line region changes with respect to the space.

Also, as will be described later, it is possible to fix the position of the sight line region 20 on the display screen 2 or release the fixation in accordance with a predetermined operation input by the user. Accordingly, it is possible to fix the display of the ID image in the sight line region 20 in the state where the user is paying attention to a certain sight line direction.

Further, as will be described later, it is possible to display or hide an image representing the sight line region 20 (sight line region boundary line) on the display screen 2 as a kind of AR image in accordance with a predetermined operation input by the user. The image representing the sight line region 20 is, for example, a boundary line, and may be an image of a broken line as illustrated. For example, when the sight line region 20a is displayed, the broken line circle as illustrated is displayed as a boundary line.

[Management Table]

FIG. 8 shows a configuration example of a management table for the control related to the AR images and ID images. This management table has a list of all AR images and ID images. The HMD 1 reads and writes information of all AR images and ID images in this management table. The processor of the HMD 1 creates and holds the management table as part of the DB 112 in the memory. By referring to this management table, the HMD 1 can grasp the states of the AR image and the ID image at that time.

The management table of FIG. 8 has a management ID, an AR object, a display position, a base position, and identification information as items. The "management ID" is identification information for management and is an address, a row number, or the like. The "AR object" is an AR image and has a corresponding image data file or the like. The "display position" is a two-dimensional coordinate (x, y) that serves as a reference position when displaying an AR image on the display screen 2. The "base position" is a three-dimensional position coordinate (X, Y, Z) that serves as the base for generating an AR image. The "base position" corresponds to, for example, a position on a map or in real space. In the case of an AR image generated independently of a real object, the table may not have the "base position". The "identification information" includes an ID and an ID image. The ID is information such as a number for identifying and selecting an AR image. The ID image is a display image including the ID, and has a corresponding image data file. ID numbers are generated in the order of, for example, 1, 2, 3, . . . . In the case of the state where the ID image is not assigned to the AR image, a value (0) indicating no ID image is set as the "identification information" item. As the other data items, a flag and the like indicating whether or not the ID image can be selected may be provided.

[Command Table]

FIG. 9 shows a configuration example of a command table corresponding to the audio recognition method according to the first embodiment. The commands that can be used are set in advance in this command table. This command table has a command ID, a target (type), a command, an audio, and remarks as items. Commands are set for each row in the table. The HMD 1 detects the "command" in the command table from the input audio. The "command ID" indicates an identifier of the "command". The "target (type)" indicates the target and type of the "command". The "audio" indicates an example of audio when the "command" is input. The "audio" is not limited to the illustrated audio, and may be set variously as long as it is the audio that can uniquely distinguish each command. The "remarks" indicates an explanation of the process content and the like.

The command IDs=C01 to C06 have the "target (type)" of "sight line" and are a command group related to the control of the sight line region. The command IDs=C11 to C42 have the "target (type)" of "ID" and are a command group related to the control of the ID image.

The "sight line region display ON" command of the command ID=C01 is a command for switching to a state in which the image representing the sight line region 20 (for example, a boundary line) shown in FIG. 6 and others is displayed on the display screen 2, and the audio is, for example, "sight line ON". The "sight line region display OFF" command of the command ID=C02 is a command for switching to a state in which the image representing the sight line region 20 is not displayed on the display screen 2, and the audio is, for example, "sight line OFF".

The "sight line region fixation" command of the command ID=C03 is a command for switching to a state in which the position of the sight line region 20 on the display screen 2 is fixed, and the audio is, for example, "sight line fixation" or "freeze". The "sight line region fixation release" command of the command ID=C04 is a command for switching to a state in which the fixed position of the sight line region 20 is released to be free, and the audio is, for example, "sight line release".

The "sight line region enlargement" command of the command ID=C05 is a command for enlarging the size of the sight line region 20 on the display screen 2, and the audio is, for example, "sight line enlargement" or "enlargement". The "sight line region reduction" command of the command ID=C06 is a command for reducing the size of the sight line region 20, and the audio is, for example, "sight line reduction" or "reduction".

The "ID display ON" command of the command ID=C11 is a command for switching to a state in which an ID image is displayed on the display screen 2, and the audio is, for example, "identification ON" or "ID ON". The "ID display OFF" command of the command ID=C12 is a command for switching to a state in which the ID image is not displayed on the display screen 2, and the audio is, for example, "identification OFF" or "ID OFF".

The "ID 1 selection" command of the command ID=C21 to the "ID 9 selection" command of the command ID=C29 are commands for individually selecting each of the nine IDs from the ID "1" to the ID "9". For example, the "ID 1 selection" command is a command for selecting an ID image "1" having "1" as an ID number (for example, the ID image b1 in FIG. 6), and the audio is, for example, "number one", "first number", or "ID one". In this example, nine numbers from "1" to "9" are used as the IDs, but ten or more IDs may be used, and each command corresponding to the numbers of "10" or more may be prepared.

When the audio detected by the audio recognition from the audio input by the user corresponds to, for example, "number one", it is interpreted as the "ID 1 selection" command and is interpreted as an operation to select the ID image "1". Then, this operation to select the ID image "1" is interpreted as the operation to select the AR image associated with the ID image "1" at that time. Consequently, the AR image is selected, and a predetermined process associated with the AR image is executed.

The "all ID selection" command of the command ID=C30 is a command for selecting all ID images in the sight line region, and the audio is, for example, "all". The "one ID selection" command of the command ID=C31 is a command for selecting any one ID image in the sight line region in accordance with a predetermined rule, and the audio is, for example, "selection". This command is a command for selecting, for example, one ID image closest to the center point of the sight line region (that is, the sight line direction) particularly when a plurality of ID images are contained in the sight line region.

The "all ID selection release" command of the command ID=C32 is a command for releasing the selected state and returning to the non-selected state when there are ID images in the selected state with respect to all the ID images in the sight line region. The corresponding audio is, for example, "all release". Also, the "one ID selection release" command of the command ID=C33 is a command for releasing the selected state of any one ID image in the sight line region and returning to the non-selected state. The commands of C32 and C33 can be applied when the ID image and the corresponding AR image have a selected state and a non-selected state separately in control.

The "ID execution" command of the command ID=C34 is a command for executing the process of the AR image associated with the ID image when there is the ID image in the selected state. The audio input is, for example, "execution". The command of C34 can be applied when the selection and the execution are separated with respect to the AR image in control. When the selection and the execution are not separated with respect to the AR image in control, the selection operation directly corresponds to the instruction to execute the process.

The "AR information display" command of the command ID=C41 is a command for displaying the information about the AR image associated with the ID image in the sight line region or the ID image in the selected state. The audio is, for example, "information ON". The "AR information hiding" command of the command ID=C42 is a command for switching the AR information by the command of C41 to the hidden state, and the audio is, for example, "information OFF". The information about the AR image is, for example, information of the name and function of the AR program or the like that generates the AR image. By referring to this information, the user can confirm the function and meaning of the AR image. Note that this command is different from the data output as an example of executing the process of the AR image by the AR program. A certain AR program performs the data output as an example of a predetermined process when an AR image is selected. For example, in the case of an AR application that provides store information on a map, this data output is to display the store information as an AR image.

Other than the above examples, the HMD 1 may be provided with audio commands for operating various functions by the OS or the like. Also, in the case of the mode in which the AR application and the support function are implemented integrally, a command corresponding to the execution of the process of the AR image by the AR application may be provided as an example of the audio command. Examples thereof include a "data ON" command for displaying data corresponding to the AR image and the like. For example, when the "data ON" command is input, an AR application that provides store information displays an AR image including the store information with respect to the AR image in the selected state.

The audio processing unit 130 of FIG. 2 may have an audio synthesis function. The HMD 1 may output an audio response to the user as appropriate by using the audio synthesis function. For example, when the user inputs a predetermined audio command, the HMD 1 may output a corresponding audio response. Examples of the audio response include an audio for confirming the input command, an audio for a question, and the like.

[AR Image and ID Image]

Figure 11:
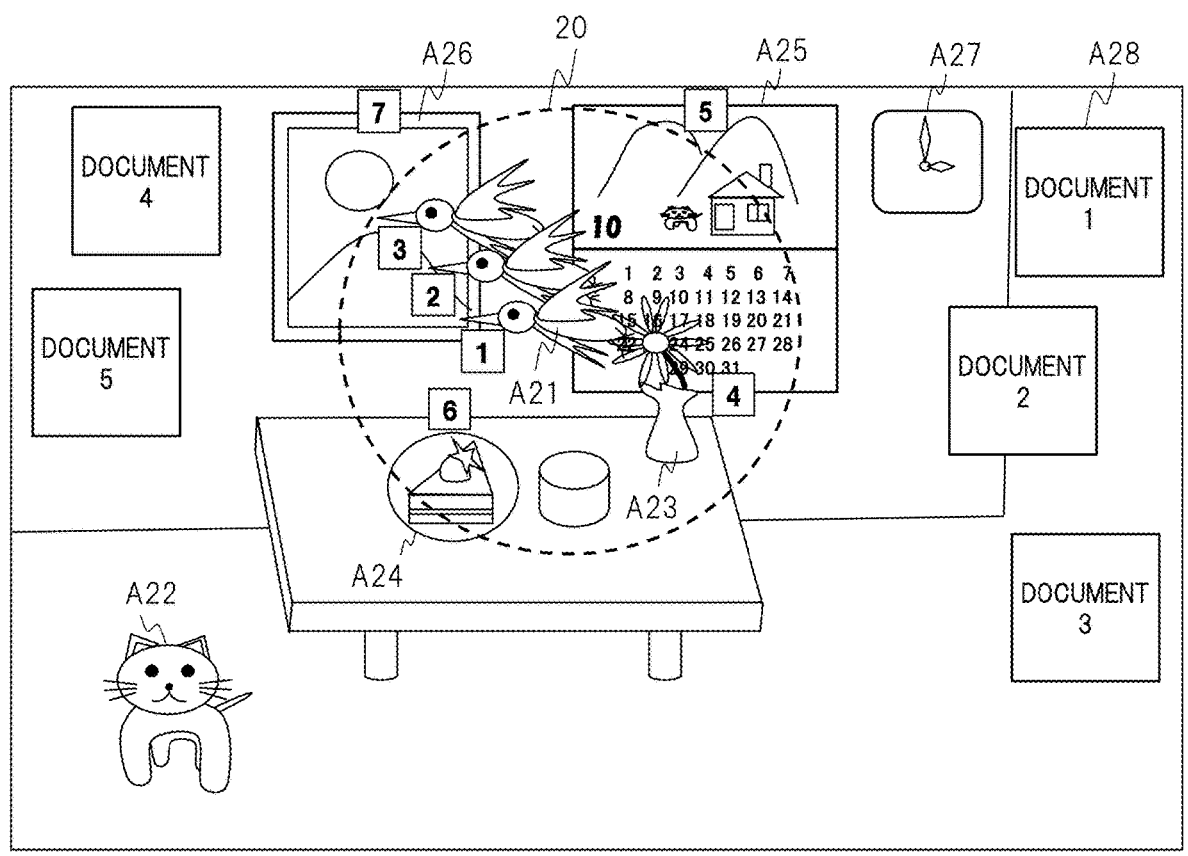
FIG. 11 is a diagram showing a second example of the real image, the AR image, and the ID image in the video display apparatus according to the first embodiment.

FIG. 10 and FIG. 11 each show a display example of the AR image and the ID image on the display screen 2. The example of FIG. schematically shows a case of including a real image in which a building of a store or the like can be seen near the road, as an example of a video when the HMD 1 is used outdoors. The example of FIG. 11 schematically shows a case of including a real image in which a table, a wall, and the like can be seen, as an example of a video when the HMD 1 is used indoors. First, a display example of the AR image that can be displayed by an existing AR program is as follows. A known technology can be applied to a method for generating and displaying an AR image, and the method is not particularly limited. Various AR methods may be used in combination. For example, the AR method of each AR application 502 in FIG. 5 may be different.

In the video of FIG. 10, AR images A1 to Al3 are shown as examples of the AR image (=AR object). The AR image A1 and the AR image A2 are examples of AR images arbitrarily arranged in the real image by the user for healing or the like. These AR images are, for example, AR images of animals such as a bird and a cat or a virtual character, and are composed of, for example, an animation image or the like. The user can arrange the selected desired AR image on the display screen 2 by a predetermined operation. This AR image is displayed at, for example, a designated fixed position on the display screen 2. Alternatively, this AR image may autonomously move on the display screen 2 in accordance with a program. For example, the AR image A1 of a bird moves like flying on the display screen 2. Also, this AR image may be always displayed on the display screen 2 regardless of the positions of the user and the HMD 1.

The AR images A3 and A4 are examples of AR images that display store information, and are images in which characters such as the name of the store are displayed in a rectangular region. For example, a certain AR application guides information of a store or the like by the use of an AR image. The AR application searches the map data for nearby stores and the like in accordance with the current position and orientation of the HMD 1. The AR application generates the AR image A3 or the like by the use of the searched information and displays it at the position on the display screen 2 associated with the geographical position of the store or the like. Alternatively, a certain AR application detects an object such as a building or a signboard of a store from the image of the camera 5, acquires information on the object, and generates and displays an AR image using the information. Any preset information such as name, type, address, state, and others can be applied to the information of the object.

The AR images A5 and A6 are examples of images that display information such as an arrow and a balloon for the navigation of the movement of the user. For example, a certain AR application has a navigation function including a route search, and generates an AR image for the route navigation from the current position to the destination in accordance with the destination input by the user. For example, the AR image A5 is an image indicating that the user is to turn to the right at the next intersection and the destination is 30 m ahead of the intersection. The AR image A6 is an image indicating that there is a station in the direction of the arrow.

The AR image A7 is an example of displaying a frame image on the detected human face. For example, in a certain AR application, information of a person such as an acquaintance of the user is registered in advance. The AR application detects the face of a person such as an acquaintance based on the image of the camera 5. The AR application assigns and displays a frame image and information about the person to the region of the detected face, as the AR image A7. Consequently, the user can discover a person such as an acquaintance and confirm the information of the person.

The AR images A8, A81, A82, and A83 show an example of a group of a plurality of AR images that display information of today's recommended dishes provided by the store when the store indicated by the AR image A4 is a restaurant. The AR image A8 is a character image of "today's recommendation". The AR images A81, A82, and A83 are the images of a plurality of dishes associated with the AR image A8. For example, a certain AR application automatically displays such detailed information of the store as push information.

In the video of FIG. 11, AR images A21 to A28 are shown. The AR image A21 is an AR image of a plurality of birds or the like arranged by the user, and is moving autonomously. The AR image A22 is an AR image of a cat or the like arranged by the user, and is, for example, stationary. The AR images A23 and A24 are AR images of a vase, a food, and others arranged by the user on the table of the real image. The AR images A25, A26, and A27 are AR images of a calendar, a painting, a clock, and others arranged by the user on the wall of the real image. For example, a certain AR application can arrange various AR objects at desired positions in a room. The AR image A28 is a plurality of AR images of icons of documents or the like arranged by the user at predetermined positions on the display screen 2. The corresponding program displays the contents of the document or the like on the display screen 2 when the AR image A28 is selected.

As in the above example, various forms including images such as icons, marks, characters, figures, animations, and three-dimensional models are possible as the display form of the AR image, and the display form of the AR image is not particularly limited. Also, as in the above example, the AR image may be of the type displayed so as to be associated with the real object and may be of the type displayed independently of the object. Further, the AR image may be accompanied by an audio output (for example, a sound effect, an animal voice, and others).

Another example of the latter type is the case where a program such as an OS of the HMD 1 displays an AR image for control. Examples of this AR image include an AR image of icons of various functions and applications, an AR image indicating the date and time, states of the battery and the communication, and others, and an AR image indicating mail notification and the like. For example, the AR image of this type is displayed on the display screen 2 for a certain period of time regardless of the position of a real object.

The method of the AR and others is not limited to the above example, and various known methods can be applied. As an example, the AR marker method may be applied. In this method, the HMD 1 detects a predetermined marker (for example, a two-dimensional code) from the real image by recognizing the image of the camera and generates and displays a predetermined AR image so as to be associated with the position of the marker. As another method, it is also possible to use a method in which an object or a point in the sight line direction is detected by using the sight line direction of the user, and an AR image is generated and displayed so as to be associated with the object or the point.

The display example of the ID image for the AR image described above is as follows. In FIG. 10, as an example of the sight line region 20, there is the sight line region 20 at an upper right position on the display screen 2. A total of seven AR images such as the AR image A1, the AR image A4, the AR image A6, and the AR images A8, A81, A82, and A83 are contained in the sight line region 20. The HMD 1 assigns ID numbers to a plurality of AR images in the sight line region 20 in order of proximity from the center point, and displays the ID images. In this example, seven ID images such as the ID images "1" to "7" are generated and displayed in order of proximity from the center point of the sight line region 20. For example, the ID image "1" is assigned to the AR image A81. The ID image "2" is assigned to the AR image A82. The ID image "3" is assigned to the AR image A83. The ID image "4" is assigned to the AR image A8. The ID image "5" is assigned to the AR image A1. The ID image "6" is assigned to the AR image A4. The ID image "7" is assigned to the AR image A6. This example is an example in which the ID images are assigned and displayed to all AR images in the sight line region 20.

In FIG. 11, as an example of the sight line region 20, there is the sight line region 20 at an upper position on the display screen 2. A total of seven AR images such as the three AR images A21, the AR images A23 and A24, and the AR images A25 and A26 are contained in this sight line region 20. In this example, seven ID images such as the ID images "1" to "7" are generated and displayed in order of proximity from the center point of the sight line region 20. For example, the ID images "1" to "3" are assigned to the three AR images A21. The ID image "4" is assigned to the AR image A23. The ID image "5" is assigned to the AR image A25. The ID image "6" is assigned to the AR image A24. The ID image "7" is assigned to the AR image A26.

[ID Image]

In the above example, numbers such as "1" and "2" are used as the ID of the ID image. The usable range of the ID of the ID image may be set. For example, in the HMD 1, the range of the ID is set to "1" to "9" in the default setting. Further, it is also possible to set the number of ID images that can be displayed simultaneously on the display screen 2 or the number of ID images that can be displayed simultaneously in the sight line region 20. For example, in the HMD 1, the maximum number of ID images in the sight line region 20 is set to five in the default setting. Due to these restrictions, the amount of information on the display screen 2 can be suppressed to make the display screen 2 easier to see.

The numbering of the ID number of the ID image is performed in accordance with a predetermined rule. For example, numbers are assigned from "1" in order of proximity from the center point in the sight line region. In addition, the numbering of the ID number is dynamically performed in accordance with the situation. Different IDs may be assigned to the same AR image depending on the situation. Also, in the first control example described later, the HMD 1 controls such that the ID image having the same ID is maintained as much as possible for the same AR image in the time series. For example, after a certain ID is once assigned to a certain AR image, the same ID may be maintained for at least a certain period of time. Further, in the second control example described later, the HMD 1 reassigns the ID image to the AR image in the sight line region in accordance with a predetermined rule at each time point in control.

Further, in the HMD 1, the user setting related to the target to be controlled is possible in such a manner that an ID image is assigned and displayed for the AR image of a specific AR application and an ID image is not assigned and displayed for the AR image of another specific AR application.

Figure 12A:
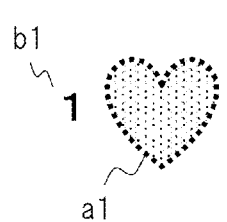
FIGS. 12A-12G are diagrams showing a first example of the ID image in the video display apparatus according to the first embodiment.
Figure 12B:
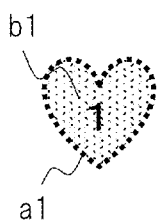
Figure 12C:
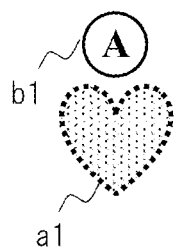
Figure 12D:
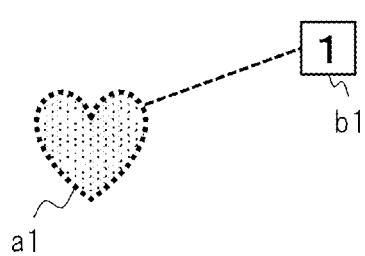
Figure 12E:
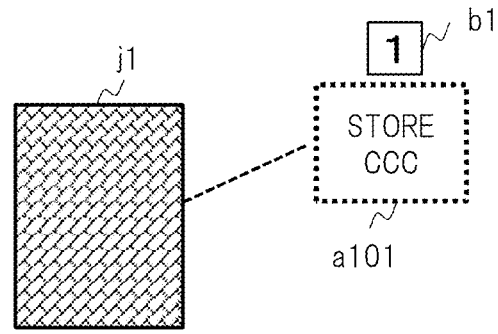
Figure 12F:
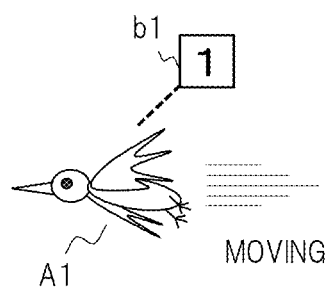
Figure 12G:
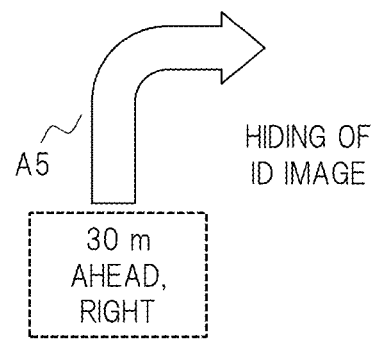

FIGS. 12A-12G shows examples of various display modes of the ID image, and all of them are applicable. In the example of FIG. 12A, for the AR image a1, the ID image b1 having the ID "1" without a frame is displayed at the left position. In the example of FIG. 12B, for the AR image a1, the ID image b1 having the ID "1" is displayed so as to be superimposed on the same position. In the example of FIG. 12C, for the AR image a1, the ID image b1 having the ID "A" in a circular frame is displayed at the upper position. This ID is an example of using the alphabetic character "A". The ID is not limited to numbers, and various characters can be applied.

The example of (D) is an example in which the ID image b1 having the ID "1" is arranged at a position slightly distant from the position of the AR image a1. Further, the AR image a1 and the ID image b1 are connected by the display of the connecting line in order to show the association. For example, when there is no space near the AR image a1, such a display may be applied.

In the example of (E), an AR image a101 for showing information of a store j1 is displayed at a position slightly distant from the position of the store j1 in the real image with a connecting line indicative of association. In the AR image a101, characters such as the name of the store j1 are displayed in the rectangular region. Also, for the AR image a101, the ID image b1 having the ID "1" is displayed at the upper position.

In the example of (F), for the AR image A1 moving on the display screen 2, the ID image b1 having the ID "1" is displayed. The ID image b1 is basically displayed at a position that follows the movement of the AR image A1. As a modification, this ID image b1 is displayed at a constant position instead of the position that follows the movement of the AR image A1. Alternatively, this ID image b1 may be displayed so as to move at a speed slower than the movement of the AR image A1.

The example of (G) shows a case where an ID image is not assigned and displayed for the AR image A5 such as an arrow even in the sight line region in accordance with the user setting. In the case where a certain AR image becomes difficult to understand if the ID image is displayed thereto, the display of the ID image can be hidden in this manner. Further, for example, in the case of an AR image that originally has characters such as numbers or a shape similar to these, the display of the ID image can be hidden.

As another example of the ID, it may be identified by a difference in color or shape. For example, shapes such as a circle, a triangle, and a square can be applied. Alternatively, for example, colors such as red, blue, and yellow can be applied.

Figure 13A:
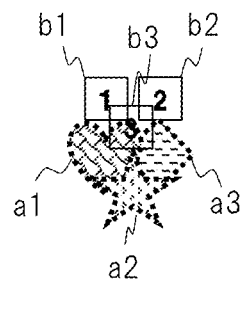
FIGS. 13A-13F are diagrams showing a second example of the ID image in the video display apparatus according to the first embodiment.
Figure 13B:
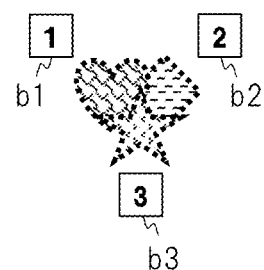
Figure 13C:
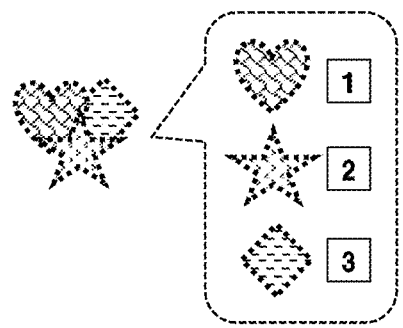
Figure 13D:
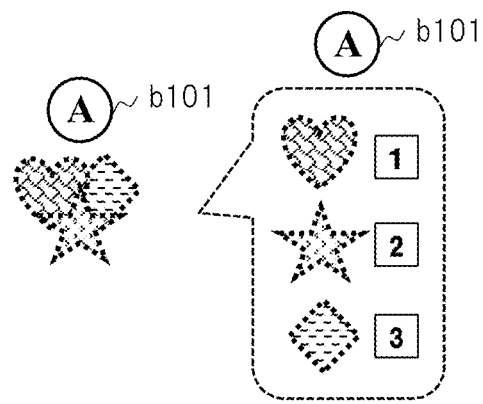
Figure 13E:
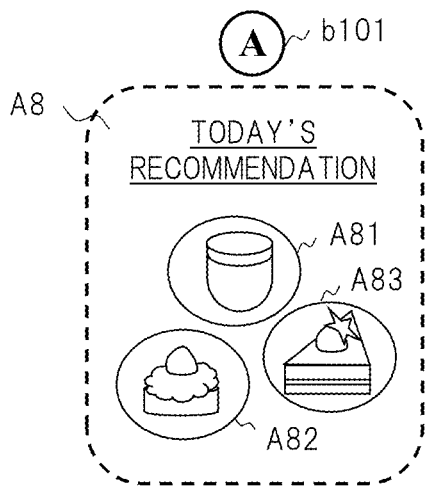
Figure 13F:
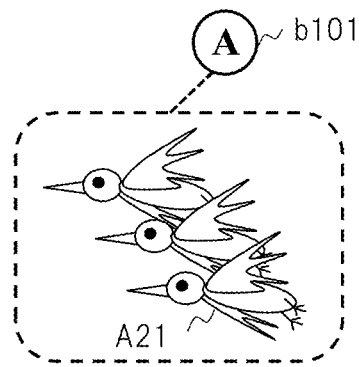

In the example of FIG. 13A, a plurality of AR images, for example, three AR images a1, a2, and a3 are densely arranged at close positions. The HMD 1 basically displays each ID image at a position near each AR image. At that time, for example, when the ID images are displayed on the upper side of the AR images, the state shown in FIG. 13A is obtained. Namely, the three ID images b1, b2, and b3 with the IDs "1" to "3" are densely displayed. In this case, the information is a little hard to see for the user. On the other hand, examples of improvement are shown in FIG. 13B and others. In the example of FIG. 13B, for the same AR images a1 to a3, the ID images are displayed at different positions, for example, positions away toward the outside. As a result, the plurality of ID images b1 to b3 do not overlap, making it easier to see. In the example of FIG. 13C, for the same three AR images a1 to a3, the three ID images b1 to b3 are arranged and displayed in the balloon image. In the balloon image, first, the AR images (which may be reduced images) are vertically arranged and displayed. Then, in the balloon image, corresponding ID images are displayed beside the AR images.

Further, the example of (D) shows an example in which a plurality of AR images (for example, the AR images a1 to a3) are grouped and one ID image b101 is assigned and displayed to the group. The ID image b101 is, for example, an image having an ID "A" as a group ID. For example, the ID image b101 of the group ID "A" is displayed at a position near the AR images a1 to a3 or a position near the balloon image. In this case, it is possible to collectively select the group of the plurality of AR images a1 to a3 by the operation to select the ID image b101 for each group. As a modification, the HMD 1 initially displays only the ID image b101 for each group at a position near the densely arranged AR images a1 to a3. Then, when the user performs the operation to select the ID image b101, the HMD 1 displays the information of the plurality of AR images a1 to a3 and the ID images b1 to b3 included in the group in the balloon image or the like, thereby enabling the selection operation of the individual images.

The example of (E) shows an example in which, when there are a plurality of AR images originally related as a group like the AR images A8 and A81 to A83 of FIG. 10, the ID image b101 for each group is similarly assigned and displayed. The HMD 1 surrounds the AR images A8 and A81 to A83 to be a group by a frame or the like, and assigns and displays the ID image b101 including the frame. The example of (F) is an example of the three AR images A21 of FIG. 11, and shows an example of similarly assigning and displaying the ID image b101 for each group.

Figure 14:
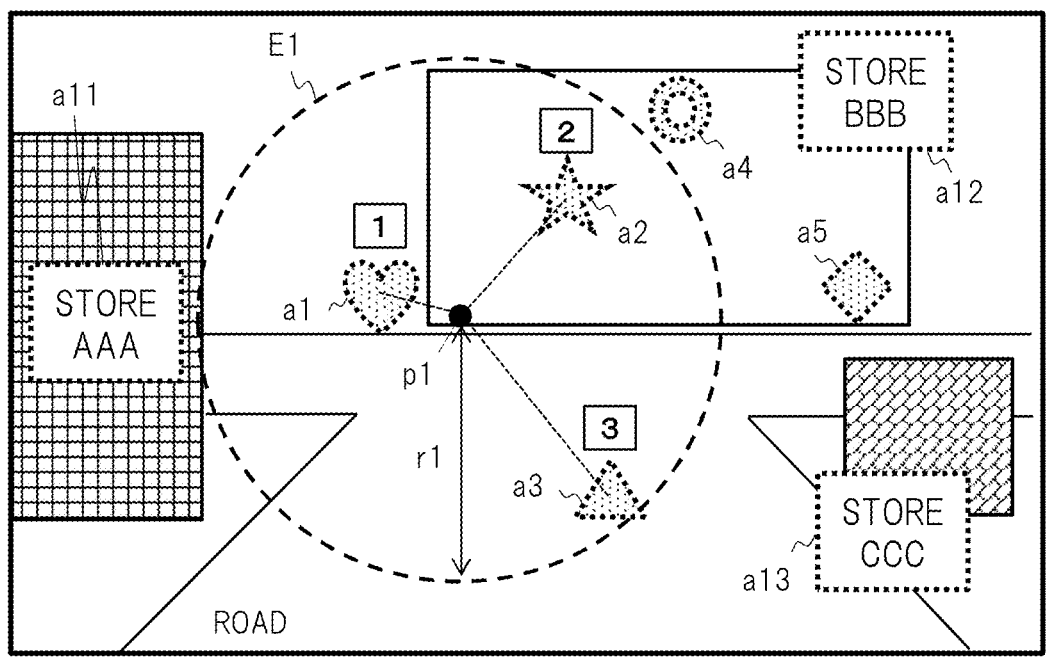
FIG. 14 is a diagram showing a first state of a video in the video display apparatus according to the first embodiment.

[Display control example (1)] A more detailed ID image display control example in the first embodiment will be described below. The HMD 1 performs the control to assign and display an ID image in accordance with the change in the AR image due to the change in the sight line region 20. FIG. 14 and others show a first control example. In the first control example, the ID image having the same ID is maintained for a certain AR image as much as possible. For example, when a certain first AR image enters the sight line region, an ID image with an ID "1" is assigned and displayed. Thereafter, when the first AR image comes out of the sight line region, the assignment of the ID "1" is maintained internally and the ID image is hidden. Then, when the first AR image enters the sight line region again, the ID image with the same ID "1" is displayed again. On the other hand, in a second control example, the ID image having the same ID is not maintained for a certain AR image as much as possible, but the ID is reassigned each time in accordance with the state in the sight line region at that time.

FIG. 14 shows a first state of the video on the display screen 2. In this example, the buildings of three stores are seen near the road in the real image. Examples of the AR image displayed in the first state include AR images a1, a2, a3, a4, a5, a11, a12, and a13. The AR images a1 to a5 are examples of marks with each shape, and the AR images a11, a12, and a13 are examples of rectangular images indicating the store information. The sight line region 20 is a sight line region E1 in the first state, and has a center position p1 (x1, y1) and a radius r1. In the first state, the AR images a1, a2, and a3 are contained in the sight line region E1. The AR images a4, a5, a11, a12, and a13 are outside the sight line region E1. In this example, the determination as to whether or not the AR image is within the sight line region is made based on the determination as to whether or not the "display position" (FIG. 8) of the AR image is within the sight line region, but the determination is not limited to this and can be made in other ways. As another method, it can be made based on the determination as to whether or not a part of the region of the AR image is within the sight line region.

For example, the HMD 1 assigns the IDs to the AR images in order of proximity from the center position p1 of the sight line region E1. In this example, the AR image a1 is closer to the position p1 than the AR image a2, and the AR image a2 is closer to the position p1 than the AR image a3. Therefore, the HMD 1 assigns and displays the three ID images "1", "2", and "3" to the three AR images a1, a2, and a3, respectively.

The ID numbering method is not limited to this example, and various methods can be applied. As an example of another method, there is a method of numbering in the order of entry of the AR images into the sight line region. Further, as an example of still another method, there is a method in which the sight line region is scanned in a predetermined order (for example, the line-sequential scanning from the upper left to the lower right) and the numbers are assigned in the corresponding order.

As in the above example, the HMD 1 of the first embodiment displays the ID image only in the sight line region when there are a plurality of AR images on the display screen 2. Therefore, since the amount of information is suppressed, the user can easily operate the AR image. The user can operate the AR image noticed in the vicinity of the sight line direction, by performing the operation to select the ID image associated with the AR image. Note that the HMD 1 may delete the ID image when a certain period of time has elapsed after displaying the ID image for the AR image in the sight line region. The ID image may be a translucent image.

Figure 15:
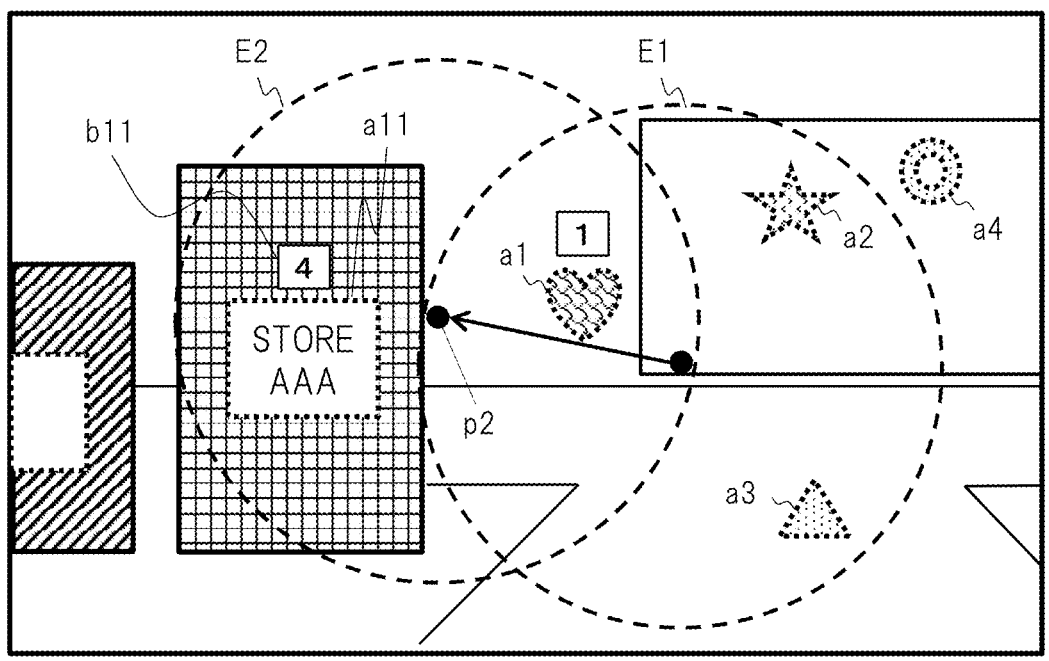
FIG. 15 is a diagram showing a second state of the video in the video display apparatus according to the first embodiment.

FIG. 15 shows a second state of the video on the display screen 2. It is assumed that the orientation of the HMD 1 and the sight line move slightly to the left from the sight line region E1 in the first state to reach a sight line region E2 in the second state. In the second state, the AR image a1 is still in the sight line region E2, the AR image a11 newly enters the sight line region E2, and the AR images a2 and a3 come out of the sight line region E2. The AR image a11 is an example of a rectangular image indicating store information ("store AAA").

The HMD 1 maintains the display of the ID image "1" for the AR image a1. The HMD 1 hides the ID images "2" and "3" for the AR images a2 and a3. The HMD 1 assigns and displays the ID image "4" to the AR image a11. In the first control example, even when the ID images "2" and "3" of the AR images a2 and a3 are hidden, the assigned numbers are maintained, and the number "4" next to "3" is assigned to the AR image a11. In the second state, two ID images "1" and "4" are displayed in the sight line region E2.

The case of using the second control example is as follows. The HMD 1 cancels the assignment of the ID images "2" and "3" to the AR images a2 and a3 that have come out of the sight line region E2. The HMD 1 assigns and displays the ID image "2" having the number next to the ID image "1" for the newly entered AR image a11. In this state, the ID images "1" and "2" are displayed in the sight line region E2.

Further, for example, when the sight line region E2 in the second state returns to the sight line region E1 in the first state, the case of using the first control example is as follows. The HMD 1 displays the same ID images "2" and "3" as previous for the AR images a2 and a3 that have entered the sight line region E1, and hides the ID image "4" for the AR image a11 that has come out of the sight line region E1.

[Display Control Example (2)]

Figure 16:
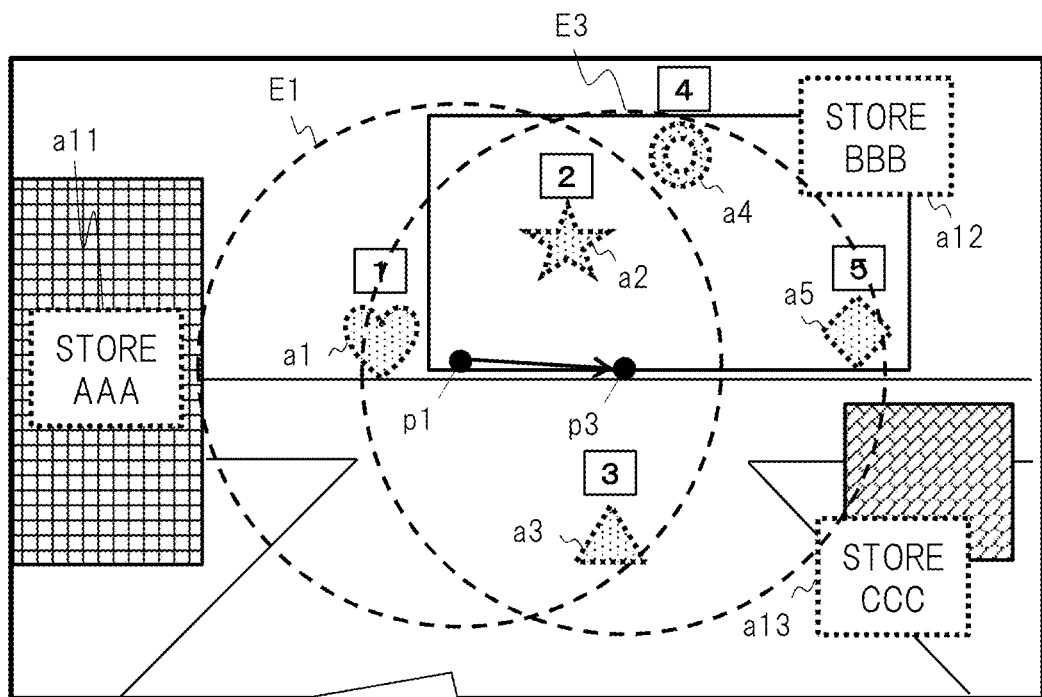
FIG. 16 is a diagram showing an example of the video in the video display apparatus according to the first embodiment.

FIG. 16 shows an example of the video on the display screen 2. It is assumed that the sight line of the user moves slightly to the right from the sight line region E1 in the first state of FIG. 14 to reach the state of a sight line region E3 of FIG. 16. The AR images a1, a2, and a3 are still in the sight line region E3, and the AR images a4 and a5 newly enter the sight line region E3. Here, it is assumed that the range of the ID is "1" to "9" and the maximum number of simultaneous display of ID images in the sight line region is three as the state of user setting. Although the positions of the five AR images are contained in the sight line region E3, the HMD 1 displays the ID images while limiting to the maximum number (=three).

The case of using the first control example is as follows. The HMD 1 first assigns and displays the ID image "4" to the AR image a4 that has entered first, and hides the ID image "1" for the AR image a1. At this time, three ID images "2", "3", and "4" corresponding to the maximum number (=three) are displayed. The HMD 1 assigns and displays the ID image "5" to the AR image a5 that has entered next, and hides the ID image "2" for the AR image a2. At this time, three ID images "3", "4", and "5" corresponding to the maximum number (=three) are displayed. In this manner, the HMD 1 displays the ID image for the newly entered AR image, and simultaneously hides the old ID (or the ID behind the movement of the sight line region or the like) so as not to exceed the maximum number. Further, when the IDs have been used up to the last ID (="9") of the range, the HMD 1 cyclically uses the IDs by returning to the first ID (="1") of the range.

In the same situation, the case of using the second control example is as follows. It is similarly assumed that the range of the ID is "1" to "3" and the maximum number is three. The HMD 1 first assigns and displays the ID image "1" to the AR image a4 that has entered first, and cancels the assignment to delete the ID image "1" for the AR image a1. At this time, three ID images "1", "2", and "3" corresponding to the maximum number (=three) are displayed. The HMD 1 assigns and displays the ID image "2" to the AR image a5 that has entered next, and deletes the ID image "2" for the AR image a2. At this time, three ID images "1", "2", and "3" corresponding to the maximum number (=three) are displayed. In this manner, the HMD 1 assigns and displays an ID image to the newly entered AR image and simultaneously cancels the assignment to delete any of the ID mages for the AR image so that the ID images "1", "2", and "3" in a predetermined range are always used.

As described above, in the HMD 1 of the first embodiment, the maximum number of ID images that can be displayed in the sight line region can be set in advance, and the number of ID images to be displayed can be suppressed. Further, for example, a plurality of AR images are densely present in the sight line region and the number exceeds the maximum number, so that all of the plurality of ID images related to the AR images cannot be displayed in some cases. The HMD 1 may automatically control the enlargement or reduction of the sight line region in accordance with the density state of the plurality of AR images in the sight line region. For example, the HMD 1 may reduce the size of the sight line region when a plurality of AR images are densely arranged. For example, the HMD 1 may enlarge the size of the sight line region when a plurality of AR images are sparsely arranged. For example, the HMD 1 may adjust the size of the sight line region so as to match the maximum number of simultaneous display. By setting the number of ID images displayed on the display screen 2 to a substantially constant number, the user can easily perform the selection operation. It is also possible to set the maximum number of simultaneous display to one. In this case, since only one ID image is displayed on the display screen 2 and the sight line region 20 at the maximum, the selection operation is easy.

[Selection of ID Image and Execution of Process of AR Image]

Figure 17:
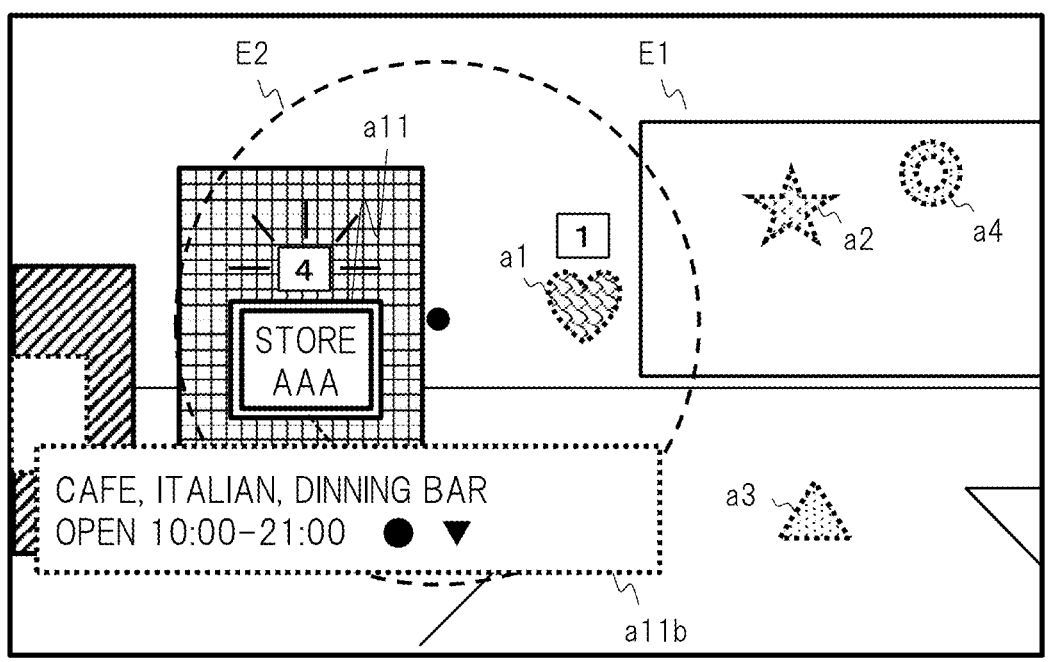
FIG. 17 is a diagram showing an example at the time of selecting the ID image in the video display apparatus according to the first embodiment.

FIG. 17 is an example of a real image similar to the example of the video of FIG. 15, and shows a display example in the case where the user selects the AR image a11 in the sight line region E2 by performing the operation to select the corresponding ID image b11 (=ID image "4"). The AR images a1 and a11 are contained in the sight line region E2, and the ID images "1" and "4" are displayed. A certain AR application displays the AR image a11 having store information. This AR application further provides detailed information about the store in an appended AR image as a predetermined process in response to the selection operation of the AR image a11.

It is assumed that the user wants to see detailed information about the store shown by the AR image a11. In this case, the user basically performs the operation to select the AR image a11. At that time, the user can use the ID image b11 displayed for support instead of the AR image a11. In this example, the user performs the operation to select the ID image b11. When the audio command is used, the user performs audio input of the ID number "4" (corresponding "ID 4 selection" command) shown by the ID image b11. For example, the user inputs an audio "number four" or the like. The HMD 1 recognizes the audio and detects it as the "ID 4 selection" command. The HMD 1 interprets the command as the operation to select the ID image b11 having the ID "4", and interprets it as the operation to select the AR image a11 associated with the ID image b11 at that time.

The HMD 1 differentiates the display of the ID image b11 in response to the operation to select the ID image b11 (FIG. 4, step S24). Note that the HMD 1 may differentiate also the display of the target AR image a11 correspondingly. Further, the HMD 1 notifies the corresponding AR application of the selection of the AR image a11 (FIG. 5). Consequently, the AR application puts the AR image a11 into the selected state, and performs a predetermined process defined in correspondence with the selection operation, in this example, the store detailed information display.

The AR application constitutes an AR image a11b including detailed information about the store, and displays it at the position of the AR image a11 or the position near the AR image a11. In this example, the detailed information of the AR image a11b includes information such as the type of "store AAA" and business hours. In the AR application, a certain AR image may be composed of a plurality of AR images (for example, a plurality of layers, a plurality of pages, etc.). The HMD 1 may assign and display an ID image for each of the plurality of AR images. The data output by the AR application may be audio output. Further, for example, when the AR application receives a predetermined operation (for example, second selection operation) by the user to the AR image a11 or the AR image a11b, the AR application deletes the AR image a11b.

[Deletion of ID Image]

A control example of deleting the ID image will be described. The HMD 1 deletes the ID image in the sight line region, in other words, switches to hide the ID image in accordance with a predetermined operation of the user. This will be described with reference to the example of the video of FIG. 14. In the sight line region E1, three ID images "1" to "3" are displayed so as to be associated with the AR images a1 to a3. In this state, when the user wants to delete the ID image in the sight line region E1, for example, the user inputs the "ID display OFF" command of C12 in FIG. 9. In response to this, the HMD 1 switches the ID images "1" to "3" in the sight line region E1 to the hidden state. When the ID image is in the hidden state, the HMD 1 invalidates the operation to select the ID image. In the state where the ID image is deleted, the corresponding AR image is displayed, but the selection operation thereof cannot be performed. For example, even if the user inputs the "ID 1 selection" command in this state, it is not possible to select the ID image "1" and the AR image a1. Also, when the user wants to display the ID image again, for example, the user inputs the "ID display ON" command of C11 in FIG. 9. In response to this, the HMD 1 switches the ID images "1" to "3" in the sight line region E1 to the display state.

As a modification, the ID image and the corresponding AR image may be deleted at the same time in response to a predetermined command.

[Selection of Plurality of ID Images]

A control example in the case of selecting one or a plurality of ID images from a plurality of ID images in the sight line region will be described. First, in the example of the video of FIG. 14, the user can designate and select individual AR images by using individual commands (FIGS. 9, C21 to C29) for the ID images "1" to "3" in the sight line region E1. In addition, the user can also select a plurality of AR images at once by the operation of consecutively designating a plurality of ID images within a certain period of time. For example, when the audio method is used, the user consecutively utters a plurality of ID numbers within a certain period of time. In the audio recognition process, the HMD 1 detects a plurality of words (corresponding audio units) within a certain period of time, and interprets them as a command composed of a connection of a plurality of words. The input audio is, for example, "one, three, five" or the like. Consequently, the ID images "1", "3", and "5" can be selected at once. Further, for example, when it is desired to select a range of ID images "2", "3", "4", and "5" having consecutive numbers, the user utters the range. The input audio is, for example, "two to five" (meaning 2 to 5). This makes it possible to select the range collectively.

As another method, when the user wants to select all the ID images "1" to "3" in the sight line region E1, for example, the user inputs the "all ID selection" command of C30 in FIG. 9. In response to this, the HMD 1 selects all the ID images "1" to "3" in the sight line region E1. Consequently, all three corresponding AR images a1 to a3 can be selected.

As another method, the user can also select one ID image closest to the center of the sight line in the sight line region E1. In this case, the user inputs, for example, the "one ID selection" command of C31 in FIG. 9. In response to this, the HMD 1 selects the ID image closest to the center of the sight line region E1, for example, the ID image "1". Consequently, only one corresponding AR image a1 can be selected.

[Enlargement/Reduction of Sight Line Region]

Figure 18:
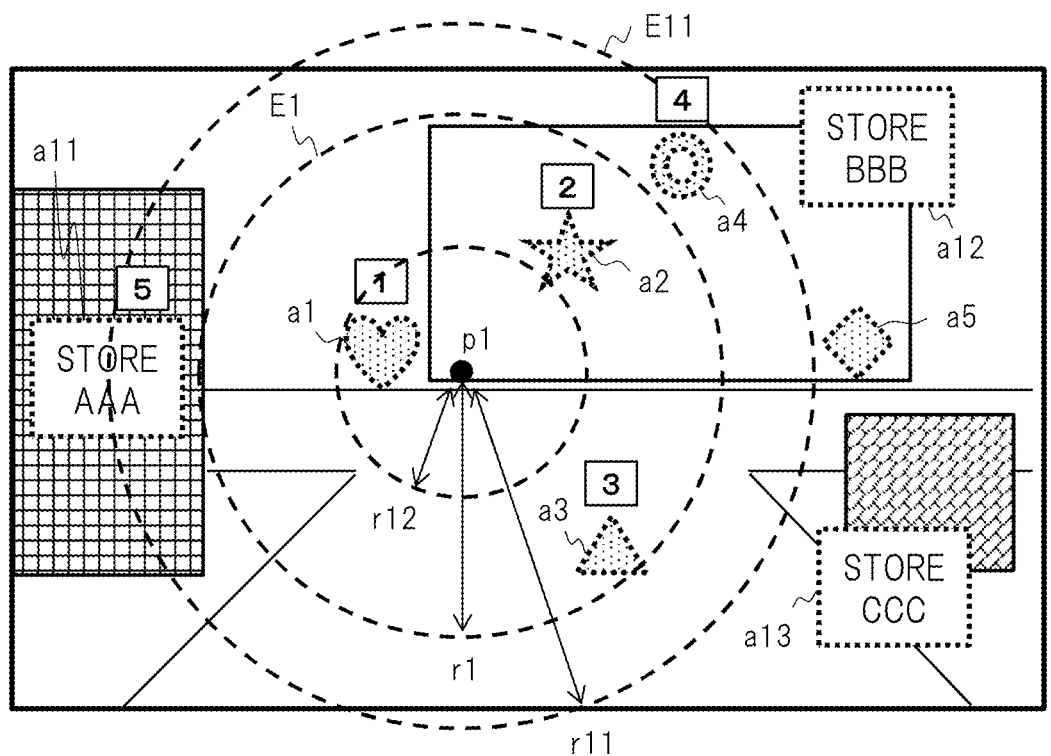
FIG. 18 is a diagram showing a first example of enlargement/reduction of the sight line region in the video display apparatus according to the first embodiment.

FIG. 18 shows a control example in the case where the sight line region is enlarged or reduced in accordance with a predetermined operation of the user. The example of the video of FIG. 18 is the same as that of FIG. 14. It is assumed that the sight line region is initially in the state of the sight line region E1. When the user wants to enlarge the sight line region, for example, the user inputs the "sight line region enlargement" command of C05 in FIG. 9. In response to this, the HMD 1 enlarges the sight line region E1 to be displayed. A sight line region E11 after enlargement is shown. The sight line region E11 has a radius r11 larger than the original (r11>r1). Further, when the user wants to reduce the sight line region, for example, the user inputs the "sight line region reduction" command of C06 in FIG. 9. In response to this, the HMD 1 reduces the sight line region E1 to be displayed. A sight line region E12 after reduction is shown. The sight line region E12 has a radius r12 smaller than the original (r12<r1).

In the case of the sight line region E11 after enlargement, the AR images a4 and a11 newly enter. In response to this, for example, the HMD 1 assigns and displays the ID images "4" and "5" to the AR images a4 and a11 within the condition of the maximum number (for example, five). When the maximum number is, for example, three, the ID images "4" and "5" are not assigned and displayed for the AR images a4 and a11. In the case of the sight line region E12 after reduction, the AR images a2 and a3 come out, and only the AR image a1 is still contained. In response to this, the HMD 1 switches the ID images "2" and "3" of the AR images a2 and a3 to be hidden. In this manner, the number of ID images displayed on the display screen 2 can be changed by the operation to enlarge/reduce the sight line region. Since the number of ID images can be changed in accordance with the state seen by the user, the user can easily perform the operation to select the ID image.

The HMD 1 of a modification may use the following method as another control example related to the enlargement/reduction of the sight line region. In this control example, the HMD 1 does not enlarge/reduce the sight line region in accordance with the operation of the user as in the case of FIG. 18, but enlarges/reduces the sight line region based on an automatic determination. It is assumed that the maximum number of ID images that can be simultaneously displayed in the sight line region is set to, for example, three based on the user setting in advance. Note that a command for changing the setting of this maximum number may be provided. An example of the audio is "three at maximum".

Figure 19A:
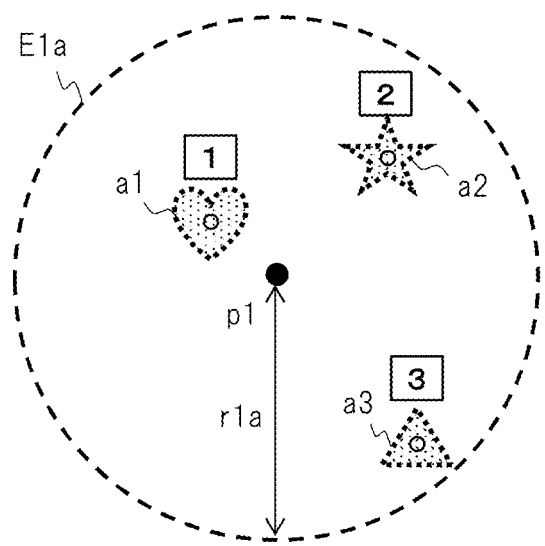
FIG. 19A and FIG. 19B are diagrams showing a second example of enlargement/reduction of the sight line region in the video display apparatus according to the first embodiment.

In the example of FIG. 19A, a plurality of AR images (for example, AR images a1, a2, and a3) are arranged on the display screen 2 at relatively low density and at wide intervals. In this case, the HMD 1 detects up to a maximum number of AR images, that is, three AR images, in order of proximity from the position p1 with reference to the position p1 at the center of the sight line region. For example, the AR image a1 is closer to the position p1 than the AR image a2, and the AR image a2 is closer to the position p1 than the AR image a3. The HMD 1 constitutes the sight line region 20 so as to have a size corresponding to the arrangement state of the three AR images. In this example, a radius r1a capable of containing the three AR images a1 to a3 is set, and a sight line region E1a having the radius r1a is configured. Then, the HMD 1 assigns and displays the ID images "1" to "3" to the AR images a1 to a3 in this sight line region E1a.

Figure 19B:
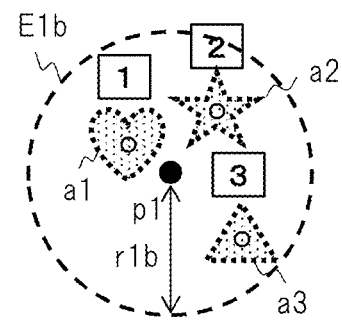

In the example of FIG. 19B, a plurality of AR images (for example, AR images a1, a2, and a3) are arranged on the display screen 2 at relatively high density and at narrow intervals. For example, it is assumed that the state of the AR image changes from the state of FIG. 19A to the state of FIG. 19B. In this case, the HMD 1 similarly detects up to a maximum number of AR images, that is, three AR images, in order of proximity from the position p1 at the center of the sight line region. The HMD 1 constitutes the sight line region 20 so as to have a size corresponding to the arrangement state of the three AR images. In this example, a radius r1b capable of containing the three AR images a1 to a3 is set, and a sight line region E1b having the radius r1b is configured. Then, the HMD 1 assigns and displays the ID images "1" to "3" to the AR images a1 to a3 in this sight line region E1b.

As described above, in this modification, the sight line region is automatically adjusted in accordance with the arrangement state of the AR images on the display screen 2. This modification is particularly effective when an image representing a sight line region is displayed.

As another control example, the shape of the sight line region may be changed by using a predetermined command. For example, commands such as vertical enlargement, vertical reduction, horizontal enlargement, and horizontal reduction may be provided. The user can select in advance the size and shape of the sight line region on the display corresponding to the user settings window provided by the HMD 1.

[Fixation of Sight Line Region]

Figure 20:
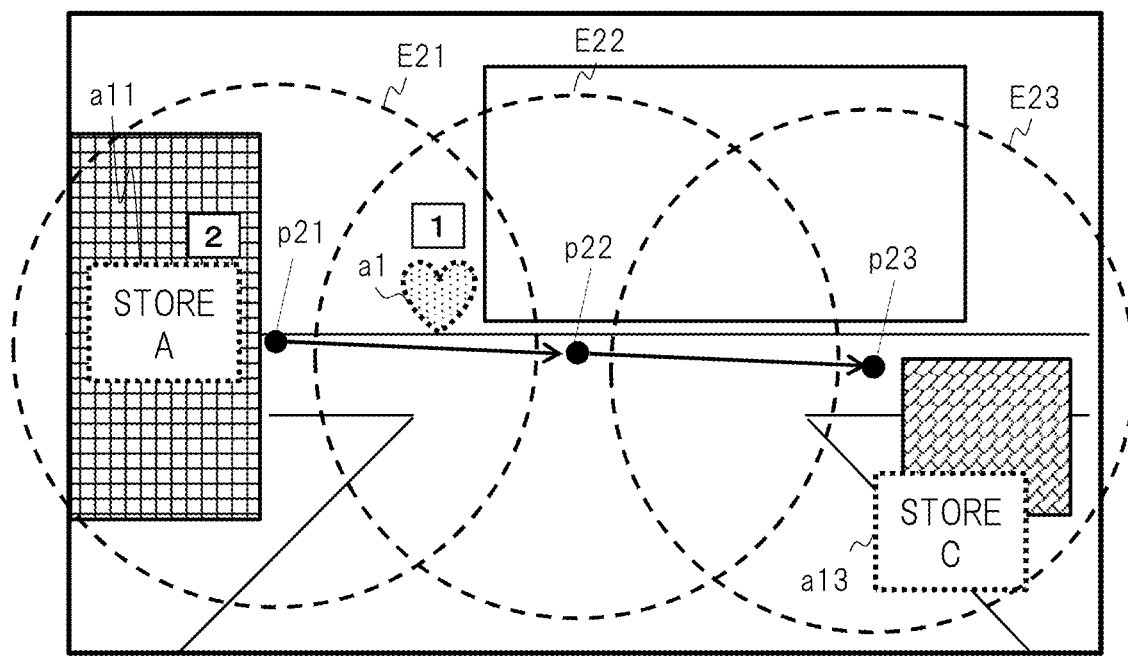
FIG. 20 is a diagram showing an example of fixation of the sight line region in the video display apparatus according to the first embodiment.

FIG. 20 shows a control example related to the fixation of the sight line region and the fixation of the ID image in the sight line region. The user can temporarily fix the sight line region or release the fixation in accordance with a predetermined operation. By fixing the sight line region, the display of the ID image in the sight line region is fixed, and the display of the ID image can be maintained even when the sight line moves.

In the example of the video of FIG. 20, it is assumed that the sight line region is initially in the state of a sight line region E21. The AR images a1 and a11 are contained in the sight line region E21 centered on a position p21, and the corresponding ID images "1" and "2" are displayed. When the user wants to fix the state of the ID images "1" and "2" of the sight line region E21, for example, the user inputs the "sight line region fixation" command of C03 in FIG. 9. When the HMD 1 receives this command, the HMD 1 fixes the state including the position and size of the sight line region E21 at that time. Together with this fixation, the state of the ID images "1" and "2" displayed in the sight line region E21 is also fixed.

After the above fixation, for example, it is assumed that the user moves the sight line to the right and the position to which the sight line is directed moves from the position p21 to the position p22 and from the position p22 to the position p23. At this time, if the sight line region is not fixed, the sight line region E21 changes to sight line regions E22 and E23. An AR image a13 newly enters the sight line region E23, and an ID image is assigned and displayed. On the other hand, in the case where the sight line region is fixed as in this control example, the sight line region E21 remains unchanged. Therefore, the ID images "1" and "2" of the AR images a1 and a11 are still displayed, and no ID image is assigned and displayed for the AR image a13. Even when the sight line of the user is at the position p23 or the like, the user can perform the operation to select the ID images "1" and "2".

Further, when the user wants to release the fixation of the sight line region 20, the user inputs, for example, the "sight line region fixation release" command of C04 in FIG. 9 as a predetermined operation. In response to this, the HMD 1 releases the fixed state of the sight line region E21. The HMD 1 resets a new sight line region in accordance with the position of the sight line existing at the time of release. For example, when the sight line is at the position p23 at the time of release, the sight line region E23 is configured. Consequently, for example, the ID image "1" is assigned and displayed to the AR image a13 in the sight line region E23, and the ID image "1" and the like for the AR image a1 and the like outside the sight line region E23 are deleted.

[Deviation of Sight Line Region]

Figure 21A:
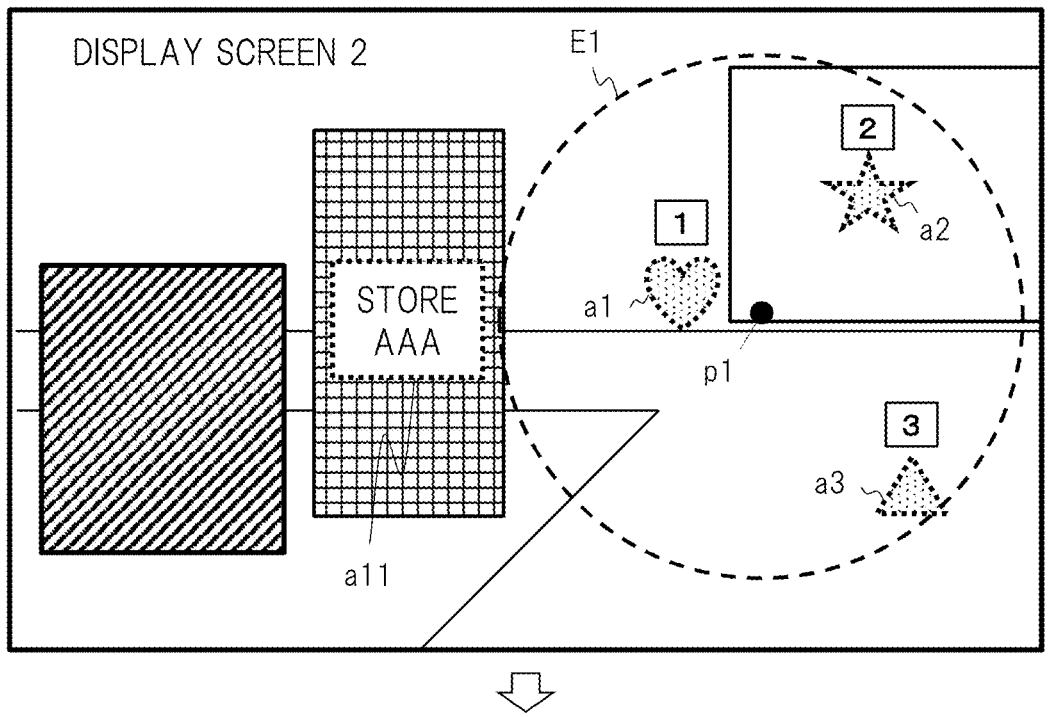
FIG. 21A and FIG. 21B are diagrams showing an example of deviation of the sight line region in the video display apparatus according to the first embodiment.
Figure 21B:
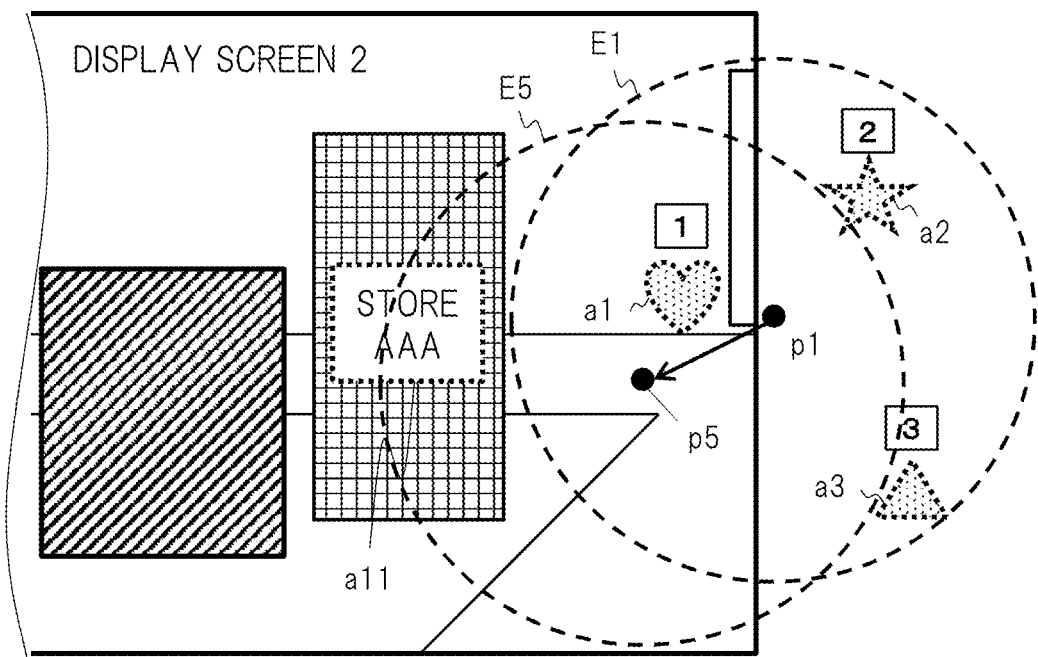

FIG. 21A and FIG. 21B shows a control example related to the case of deviation of the sight line region. When the sight line region is set in step S3 of FIG. 3 described above, the HMD 1 determines whether or not the sight line region deviates from the display screen 2. When the HMD 1 determines that the sight line region has deviated, the HMD 1 resets the sight line region accordingly. First, it is assumed that the sight line region is in the state of in FIG. 21A. In this state, the AR images a1 to a3 are contained in the sight line region E1, and the ID images "1" to "3" are displayed. Further, the AR image a11 corresponding to the store or the like is displayed on the display screen 2. Although there is also a building on the left of the building indicated by the AR image a11, the corresponding AR image is not generated because the information thereof could not be acquired. In this state, the sight line region E1 does not deviate from the display screen 2.

Next, for example, it is assumed that the orientation of the HMD 1 changes due to the movement of the user's head, resulting in the state of (B). It is also assumed that the sight line is not changed and the same position p1 is seen. In this state, about half of the sight line region E1 comes out of the region of the display screen 2, and a portion of about a semicircle remains on the display screen 2. For example, when the position p1 at the center of the sight line comes out of the region of the display screen 2, the HMD 1 determines this state as "deviation" of the sight line region. In (B), the AR images corresponding to those of (A) are illustrated outside the display screen 2 for easy understanding in the description. This example shows the case in which the sight line region has deviated due to a change in the orientation of the HMD 1, but the sight line region may deviate due to the movement of the sight line of the user in some cases.

When the position p1 is within the display screen 2, the sight line region is regarded as being valid even if a semicircular portion of the sight line region only remains. The display of the ID image "1" is maintained for the AR image a1 in the sight line region. On the other hand, the AR images a2 and a3 that are inside the semicircular portion outside the display screen 2 are of course not displayed together with the corresponding ID images "2" and "3". When the position p1 comes out of the display screen 2, the HMD 1 determines that the sight line region E1 is in a deviant state, and resets the ID image in the sight line region. For example, the HMD 1 cancels the assignment of the ID images "2" and "3" for the AR images a2 and a3.

Also, when the position of the sight line of the user returns to the inside of the display screen 2, the HMD 1 sets the sight line region in accordance with the position. For example, when the position to which the sight line is directed moves from the position p1 to the position p5 of (B), a sight line region E5 is configured in accordance with the position p5. In this case, for example, the ID image "2" is assigned and displayed to the AR image a11 because the AR image a11 newly enters the sight line region E5.

As a modification, the HMD 1 may determine whether or not the entire image region of the sight line region 20 has completely deviated from the display screen 2.

[Effect (1)]

As described above, according to the video display apparatus of the first embodiment, the sight line region is set in accordance with the sight line direction to which the user is paying attention, and the ID image is displayed in the sight line region, whereby the operability and usability for a user in relation to the AR image can be improved. In particular, according to the first embodiment, since the display of the ID image is limited within the sight line region, the amount of information on the display screen 2 is suppressed from the user's point of view, and the operation to select the AR image using the ID can be easily performed. Since the user only has to select from a small number of IDs, the operation is easy.

Further, in the first embodiment, as shown in FIG. 3, after the AR image is detected (step S2), the sight line region is set (step S3) and the ID image is displayed (step S5). The user can set the sight line region while visually confirming the AR image on the display screen 2, and can perform the operation to select the ID image in the sight line region. Therefore, it is possible to reduce the oversight of the AR image on the display screen 2.

Comparative Example

As an HMD which is a video display apparatus according to a comparative example for the first embodiment, a configuration example described in Patent Document 1 will be described for comparison. In the HMD of the comparative example, for example, one AR image is acquired from a list of AR images (=AR objects) displayed on the display screen, and the ID number is assigned when the AR image is a selectable AR image. Then, the HMD displays the image of the assigned ID near the AR image. In the comparative example, the ID image is assigned and displayed to the AR image regardless of the sight line direction of the user. Therefore, a large number of the AR images and the corresponding ID images (corresponding numbers) are displayed or the plurality of ID images are densely present on the display screen in some cases. In that case, there is a possibility that it is difficult for the user to perform the operation to select the ID image.

On the other hand, in the HMD 1 of the first embodiment, the ID image is basically displayed only in the sight line region even when there are a large number of AR images on the display screen 2. Further, in the HMD 1 of the first embodiment, a plurality of ID images are displayed so as to be as easy to see as possible. Therefore, the user can easily perform the operation to select the ID image associated with the desired AR image. Further, in the HMD 1 of the first embodiment, the operation for the sight line region by the use of audio is also possible, and thus the operability of the ID image is improved.

Modification (1)

The following is also possible as a modification related to the HMD 1 of the first embodiment. In the first embodiment, the selection of the ID image is supposed to include the selection of the AR image and the execution of the process associated with the AR image as a basic concept. Namely, when a user performs the operation to select a certain ID image, a predetermined process related to the AR image associated with the ID image is automatically executed by the corresponding program. In the HMD of the modification, the selection of the ID image may be defined as a concept in which the selection of the AR image and the execution of the process of the AR image are separated. In this case, when the user performs the operation to select a certain ID image, the AR image associated with the ID image is put into the selected state by the corresponding program. Then, when the user performs a predetermined operation on the AR image in the selected state, a predetermined process related to the AR image is executed by the corresponding program. Alternatively, the above-mentioned concept of the selection of the ID image may be mixed, and it may be set so as to perform different operations at the time of the operation to select the ID image in accordance with the AR application or the specific AR image.

Modification (2)

The HMD in the modification has a function of performing the operation to select a plurality of ID images as one group. For example, there is the case in which the user wants to select a plurality of desired AR images on the display screen 2 as one group, in other words, the user wants to select a plurality of AR images at once. First, the operation to select a group can be performed by the operation to designate the group ID by the use of the group ID shown in FIGS. 13A-13C described above. Further, by using the above-mentioned "all ID selection" command, all ID images in the sight line region can be selected at once.

As another method, the user inputs, for example, a predetermined "group selection" command, and then subsequently designates individual ID images in order. For example, when the ID images "1", "3", and "5" in the sight line region are selected, the input audio is, for example, "selection, one, three, five" or the like. When the selection of the AR image and the execution of the process of the AR image are separated, the process of the AR image can be executed by putting the desired AR image into the selected state and then inputting a predetermined "execution" command.

Second Embodiment

A video display apparatus according to the second embodiment of the present invention will be described with reference to FIG. 22 to FIG. 26. The basic configuration of the second embodiment and the like is the same as that of the first embodiment, and the components of the second embodiment and the like different from the first embodiment will be described below. In the HMD of the second embodiment, a region for the operation to select the ID image (referred to as a "selection region", an "identification information region", or the like in some cases) is provided on the display screen. The user can select not only the ID image displayed in the region other than the selection region on the display screen but also the ID image displayed in the selection region.

In the case of the second embodiment, the confirmation in step S23 in the flow of FIG. 4 described above includes confirmation as to whether or not the ID image in the selection region is selected. Further, the determination of the gesture in steps S26 and S27 includes the determination of the gesture for the ID image in the selection region.

[Selection Region (1)]

FIG. 22 shows an example of a video of the display screen 2 in the HMD 1 of the second embodiment. A selection region 60 related to the ID image is provided on the display screen 2. In this example, the selection region 60 is provided as a horizontally long rectangular region near the lower side of the region of the display screen 2, and is, for example, a translucent region. The selection region 60 may be invisible to the user, or may be made visible to the user by displaying the boundary line of the selection region or the like.

As in the case described above (FIG. 11), a total of seven AR images such as the three AR images A21 and the AR images A23, A24, A25, and A26 are contained in the sight line region 20. Since these AR images are arranged relatively close to each other, it is difficult to perform the selection operation as they are. When the control of the first embodiment is used, the ID images "1" to "7" are assigned and displayed to the seven AR images. Since these ID images "1" to "7" are also arranged relatively close to each other, there is a possibility that it is difficult to perform the selection operation as they are.

Therefore, in the HMD 1 of the second embodiment, the corresponding ID images related to the seven AR images in the sight line region 20 are displayed in the selection region 60. The HMD 1 orderly arranges a plurality of ID images in the selection region in accordance with a predetermined rule. In this example, the seven ID images "1" to "7" are arranged in the selection region 60 at equal intervals so that the numbers are aligned in ascending order from left to right. For example, the ID images c1, c2, c3, . . . , and C7 are arranged in order from the left side of the selection region 60. Further, in this example, a plurality of ID images displayed in the selection region 60 have the size larger than that of the ID images in the sight line region 20. This ID image functions like an ID selection button.

The user can perform the operation to select each ID image in the selection region 60. At that time, the operation input method is not limited to the audio method described above, and a gesture method can also be used. For example, it is assumed that the user wants to select the ID image c3=ID image "3". In the case of the audio method, the ID image c3 can be selected by inputting the above-mentioned "ID 3 selection" command, so that the one corresponding AR image A21 can be selected. When the gesture method is used, the user makes a gesture of virtual touch with the fingers to the position of the ID image c3. This gesture is, for example, to move the fingertip to a position overlapping the rectangular region of the ID image "3" when viewed from the user, and to place the fingertip at that position for a predetermined time or longer. At the time of this gesture, the user's fingers are on the outside in front of the display screen 2 of the HMD 1 and is seen through the display screen 2 and the ID image. Therefore, the user and the camera 5 can grasp the state of the fingers.

The HMD 1 detects the gesture based on the recognition of the image of the camera 5 and interprets it as the operation to select the ID image c3. This detection of the operation to select the ID image by the gesture is easier and has higher detection accuracy as compared with the case where the gesture for the AR image or the ID image at various positions on the display screen is detected in the HMD in the prior art example. In the second embodiment, the detection is easy because it is only necessary to determine the gesture for the position of the ID image in the predetermined selection region 60. Even when the AR image or the ID image moves on the display screen 2, the detection is easy because the ID image is displayed at a fixed position in the selection region 60.

In the control example of FIG. 22, the respective ID images are displayed in both the sight line region 20 and the selection region 60. For example, for the AR image A21, the ID image "1" is displayed twice in the sight line region 20 and in the selection region 60. Not limited to this, as a modification, the ID image may be displayed only in the selection region 60. However, in that case, it is necessary to make it possible to understand the correspondence relationship between the AR image and the ID image. For example, the correspondence relationship can be understood by displaying a reduced image of the AR image together with the ID image or by displaying a connecting line that connects the AR image and the ID image.

As another operation input method, the operation input unit 160 of the HMD 1 may be used. For example, the user can perform the operation to select the ID image in the selection region 60 by pressing a predetermined hardware button provided in the main device or the operating device.

[Selection Region (2)]

As a modification of the second embodiment, a reduced image of the corresponding AR image or the like may be displayed together with the ID image as a set in the selection region 60.

Figure 23:
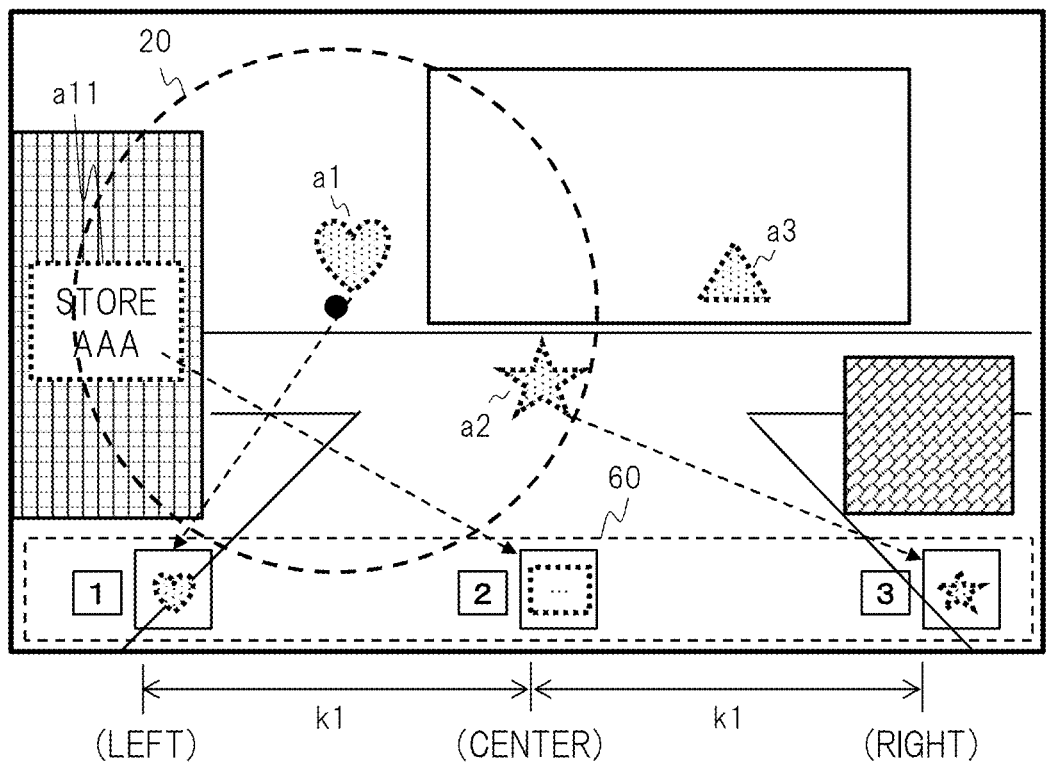
FIG. 23 is a diagram showing a first example of a selection region in the video display apparatus according to the second embodiment.

FIG. 23 shows a display example in the modification. The AR images a1, a2, and a11 are contained in the sight line region 20. The HMD 1 arranges the ID images "1", "2", and "3" associated with the AR images a1, a2, and a11 in the sight line region 20, at the positions dispersedly aligned at even intervals kl (left, center, right) in the selection region 60. Further, the HMD 1 arranges the reduced images of the AR images a1 to a3 together with the ID images as the sets. In the selection region 60, for example, at the position on the left side, the ID image "1" of the AR image a1 and the rectangular image containing the reduced image of the AR image a1 are displayed as a set. For example, at the center position, the ID image "2" of the AR image a11 and the rectangular image containing the reduced image of the AR image a11 are displayed as a set. In the selection region 60, not only a reduced image of the AR image but also a partial image obtained by cutting out a part of the AR image, an enlarged image of a part of characters, and the like may be displayed.

Since the reduced image of the AR image is an icon with which the correspondence relationship with the original AR image can be easily understood, the user can easily perform the operation to select the ID image with the feeling as if the user directly operates the original AR image.

The plurality of ID images in the selection region 60 can also be identified by the position (for example, left, center, right). The HMD 1 of the second embodiment can also perform the operation to select the ID image in the selection region 60 by the use of a command for a position designation method. Examples of the audio command include a "left ID selection" command, a "right ID selection" command, a "center ID selection" command, and the like. The "left ID selection" command is a command for selecting the ID image arranged on the left side among the ID images in the selection region 60, and the audio is, for example, "left". The "right ID selection" command is a command for selecting the ID image arranged on the right side of the selection region 60, and the audio is, for example, "right". The "center ID selection" command is a command for selecting the ID image arranged at the center of the selection region 60, and the audio is, for example, "center".

As another arrangement example in the selection region 60, in the case of arranging one ID image, the one ID image is displayed at the center position of the selection region 60, and in the case of arranging two ID images, the two ID images are displayed at the left and right positions in the selection region 60. Also in these cases, it is possible to similarly select the individual ID images by the use of predetermined commands. Although the numbers are arranged in ascending order from the left side in the selection region 60 in this example, other arrangements are possible without being limited to this.

As a modification, the ID images in the selection region 60 and the rectangular images containing the reduced images of the AR images may have different colors and shapes for identification. In this case, the user can perform the operation to distinctively select each ID image or AR image by the use of the commands for the methods of position designation, color designation, and shape designation. When the distinction by the color or the shape is provided, it may be provided to one or both of the AR image and the ID image. For example, different colors are set for the ID images (or reduced images of the AR images) to be displayed at each position (for example, left, center, right) in the selection region 60. For example, the colors are set such that the left position in the selection region 60 is red, the center position is blue, the right position is yellow, and so on. The user can select the ID image at the left position by inputting, for example, a "red ID selection" command (for example, the audio input of "red").

Further, for example, different shapes are set for each position in the selection region 60. For example, the shapes are set such that the left position in the selection region 60 is a circle, the center position is a square, the right position is a triangle, and so on. The user can perform the operation to select the ID image at the right position by inputting, for example, a "triangle ID selection" command (for example, the audio input of "triangle").

As a modification, the display of the ID image in the selection region 60 may be omitted, and only the reduced image of the AR image may be displayed.

As a modification, a plurality of ID images may be concentratedly arranged in any of the left, center, and right positions in the selection region 60.

As a modification, the form other than numbers such as colors and shapes can also be applied to the ID configuration of the ID image. The ID image is not limited to the form of the number and any form can be used as long as it can be distinctively designated by the user. In the case of the ID image other than the number, the user can perform the operation to select the ID image by the use of the predetermined commands for the methods of position designation, color designation, and shape designation.

As a modification, if there is a real image object to be the source of generating the AR image, the image of the object, the reduced image of the object image, a partial image of the object image, and the like may be used as the ID image or may be used in combination.

[Selection Region (3)]

As a modification of the second embodiment, when the ID image is arranged and displayed in the selection region 60, the ID image may be arranged and displayed at a position matched as much as possible with the position of the corresponding AR image.

Figure 24:
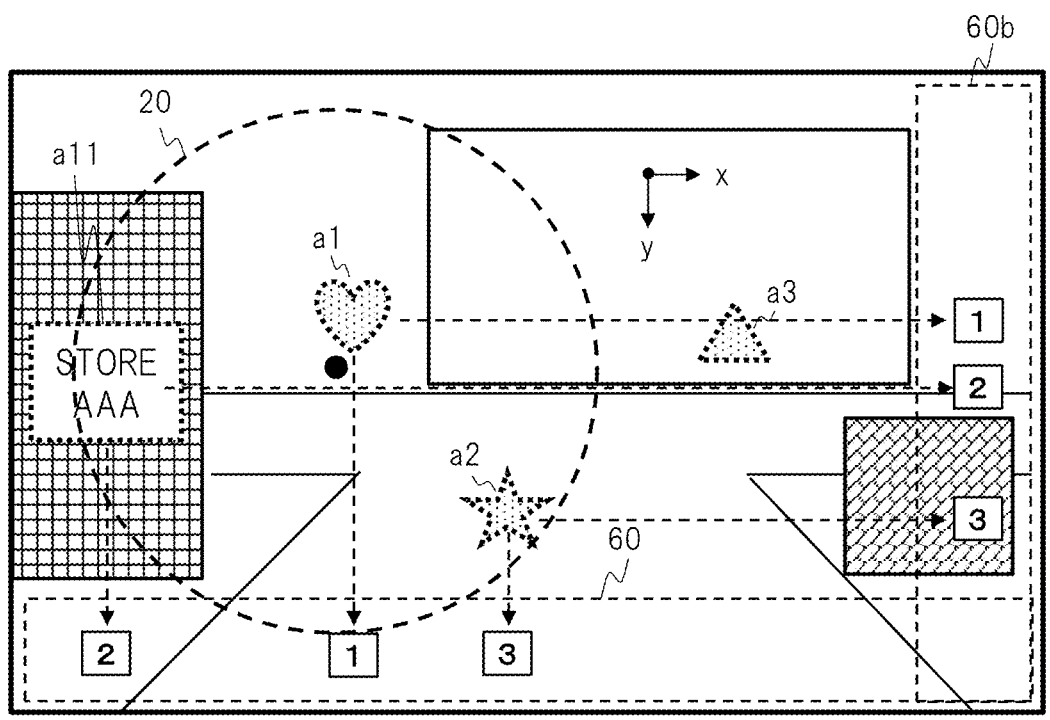
FIG. 24 is a diagram showing a second example of the selection region in the video display apparatus according to the second embodiment.

FIG. 24 shows two display examples as the display examples in this modification. When the ID images "1" to "3" related to the AR images a1, a2, and a11 in the sight line region 20 are displayed in the selection region 60 on the lower side, the HMD 1 arranges the corresponding ID images at the positions matched as much as possible with the positions of the AR images in the x direction (horizontal direction) of the display screen 2. In this example, the ID image "2" of the AR image a11, the ID image "1" of the AR image a1, and the ID image "3" of the AR image a2 are arranged in order from the left in the selection region 60. In this case, although the ID numbers are not arranged in order, the user can easily perform the selection operation because the positions in the x direction indicate the correspondence relationship with the AR images.

As another display example, the HMD 1 may provide the selection region 60 at another position on the display screen 2. A selection region 60b is an example provided near the right side on the display screen 2. When the ID images "1" to "3" related to the AR images a1, a2, and a11 in the sight line region 20 are displayed in the selection region 60b on the right side, the HMD 1 arranges the corresponding ID images at the positions matched as much as possible with the positions of the AR images in the y direction (vertical direction) of the display screen 2. Further, when it is desired to make the correspondence relationship between the AR image and the ID image easy to understand, a connecting line indicated by a broken line arrow may be displayed. Similarly, the selection region 60 may be provided on the upper side or the left side of the display screen 2. Further, the position where the selection region 60 is provided on the display screen 2 may be a variable position and determined in accordance with the position and movement of the sight line of the user.

[Effect (2)]

As described above, according to the video display apparatus of the second embodiment, the operability and usability for a user related to the AR image can be improved by using the selection region 60. In particular, according to the second embodiment, since the ID image is displayed in the selection region 60, the operation to select the ID image is easy. Also, even when the gesture method is used, the detection accuracy is improved as compared with the prior art example, and the operation to select the ID image is easy. In addition, there is a possibility that various kinds of AR images are present as the plurality of AR images displayed on the display screen 2. Each AR image may have different sizes and shapes. In the second embodiment, even if various kinds of AR images are present, the ID numbers are assigned to the AR images, and the information is orderly displayed by the ID images with a uniform size in the selection region 60. Therefore, the user can easily perform the operation to select the ID image.

Modification (1)

The following is also possible as a modification of the second embodiment. A control example using the selection region 60 in the HMD 1 according to the modification will be described below. In this control example, the HMD 1 displays the ID image for the AR image that has come out of the sight line region 20, by arranging it in the selection region 60 in accordance with a predetermined rule.

Figure 25:
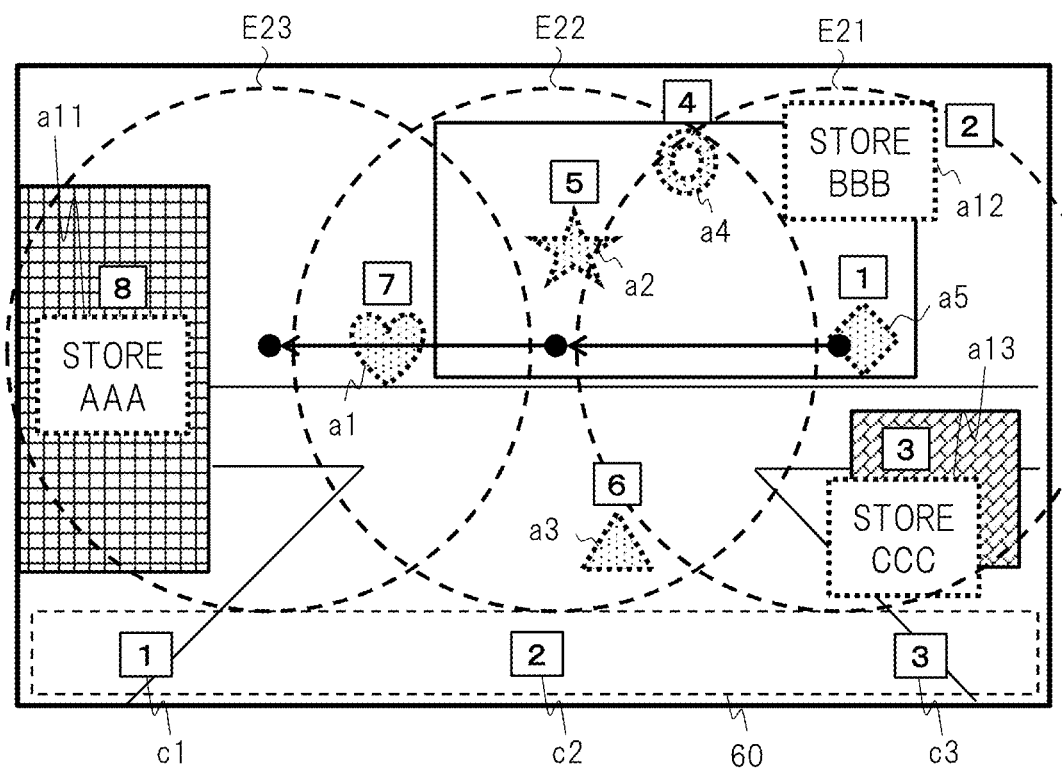
FIG. 25 is a diagram showing a third example of the selection region in the video display apparatus according to the second embodiment.

FIG. 25 shows a display example in this control example. In this example, the range of IDs to be used is set to "1" to "9", and the maximum number of simultaneous displays in the sight line region 20 is set to five. First, it is assumed that the sight line of the user is in the state of the sight line region E21. The AR images a4 and a5 and the AR images a12 and a13 are contained in the sight line region E21, and for example, the ID images "1" to "4" are displayed correspondingly. Next, it is assumed that the sight line moves to the left to reach the state of the sight line region E22. The AR images a1, a2, a3, and a4 are contained in the sight line region E22, and for example, the ID images "4" to "7" are displayed correspondingly. For the AR images a5, a12, and a13 that have come out of the sight line region E22, the ID images "1" to "3" are hidden when the control of the first embodiment is used.

The HMD 1 of this modification hides the corresponding ID images "1" to "3" for the AR images a5, a12, and a13 that have come out of the sight line region E22, and displays the corresponding ID images c1 to c3 (ID images "1" to "3") in the selection region 60. The HMD 1 arranges the three ID images c1 to c3 at the positions dispersely aligned at even intervals kl (left, center, right) in the selection region 60.

In this state, the user can perform the operation to select each of the ID images c1 to c3 in the selection region 60. Consequently, the user can also select the AR image a5 or the like outside the sight line region E22. For example, when the user performs the operation to select the ID image c1=ID image "1" in the selection region 60, the corresponding AR image a5 can be selected.

Further, it is assumed that the sight line moves to the left to reach the state of the sight line region E23. The AR images a1 and a11 are contained in the sight line region E23, and for example, ID images "7" and "8" are displayed for the AR images a1 and a11 correspondingly. In this modification, the HMD 1 hides the corresponding ID images "5", "6", and "4" for the AR images a2, a3, and a4 that have come out of the sight line region E23, and additionally displays the corresponding ID images "5", "6", and "4" in the selection region 60. Namely, the ID images "1" to "6" are displayed in the selection region 60 in a regular arrangement as in the example of FIG. 22. Similarly, in this state, the user can perform the operation to select each ID image in the selection region 60. Note that the maximum number of ID images to be displayed in the selection region 60 may also be set. For example, when the maximum number is three, the ID images "4" to "6" are displayed in the selection region 60 instead of the ID images "1" to "6".

As a modification, the HMD 1 may display the corresponding ID images for the AR images that has come out of the sight line region in the selection region 60 like a history in accordance with the order of coming out in time series. A plurality of ID images up to a predetermined number are displayed adjacent to each other in the selection region 60, and when the number exceeds the predetermined number, the oldest ID images are deleted in order. In the example of FIG. 25, when the order of the AR images that have come out of the sight line region is the AR images a13, a12, a5, a4, a3, and a2, the ID images "3", "2", "1", "4", "6", and "5" are sequentially displayed in the selection region 60.

Modification (2)

Figure 26:
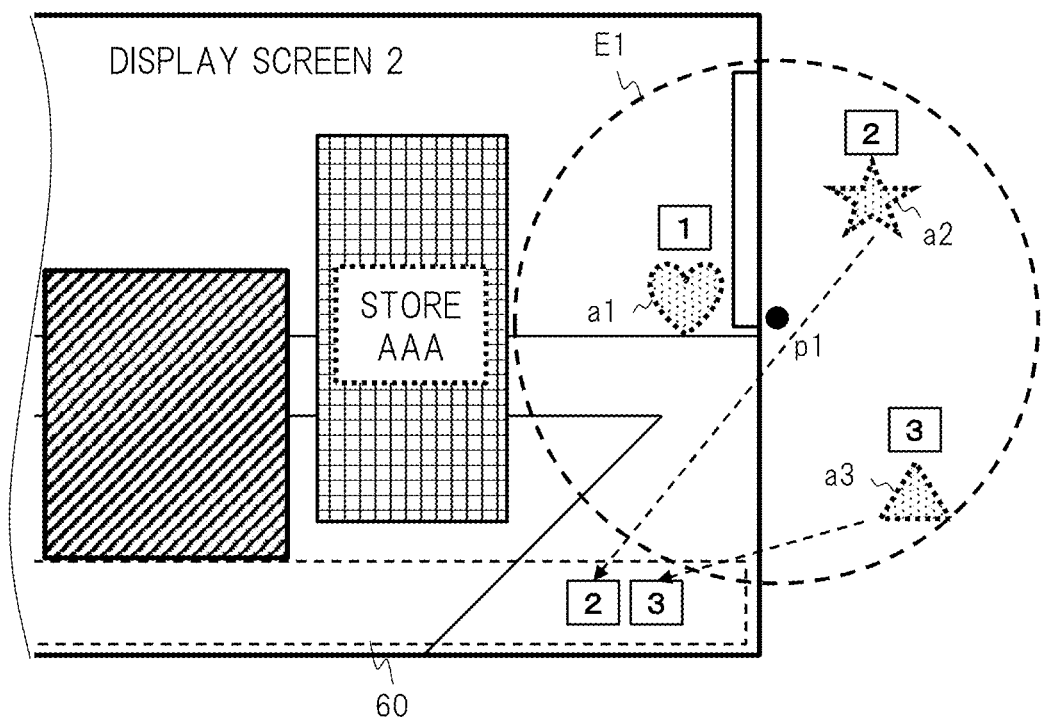
FIG. 26 is a diagram showing a fourth example of the selection region in the video display apparatus according to the second embodiment.

As the HMD 1 of the modification, when the sight line region has deviated from the display screen 2 as in the example of FIG. 21A and FIG. 21B described above, the ID images in the deviated sight line region may be displayed in the selection region 60. FIG. 26 shows a display example at the time of deviation. When the HMD 1 determines that the sight line region E1 has deviated from the display screen 2, the HMD 1 displays the ID image of the AR image that has been in the sight line region E1 but is no longer visible, in the selection region 60. For example, the ID image "2" of the AR image a2 and the ID image "3" of the AR image a3 that have been in the sight line region E1 are arranged near the right side of the selection region 60. In this example, since the deviation occurs on the right side of the display screen 2, the ID image is displayed at a position close to the right side in the selection region 60. As the ID image to be displayed at this time, a reduced image of the AR image or the like may be used as in the case described above. In this modification, the ID image that has come out of the display screen 2 can also be effectively used.

Third Embodiment

A video display apparatus according to the third embodiment of the present invention will be described with reference to FIG. 27. In the HMD of the third embodiment, the order of process is different in relation to the flow of FIG. 3, and the main change is that step S2 and step S3 are reversed. In the HMD of the third embodiment, after the sight line region is set, the AR image in the sight line region is extracted and displayed, and the ID image is then assigned and displayed.

FIG. 27 shows the flow in the third embodiment. In step S1, the HMD 1 detects the position and the like of the HMD 1. In step S2b, the HMD 1 detects the sight line direction and sets the sight line region. In step S3b, the HMD 1 generates an AR image and displays the AR image in the sight line region when it falls within the range of the sight line region. In step S4b, the HMD 1 detects the AR image that falls within the range of the sight line region. In step S5, the HMD 1 assigns and displays an ID image to the AR image in the sight line region. In the third embodiment, the AR image and the ID image are displayed only in the sight line region by the flow configuration described above.

[Display Example]

A display example of the video in the HMD 1 according to the third embodiment is as follows. The description will be given by the use of the example of FIG. 14 described above. Although the AR image is displayed also outside the sight line region E1 in the example of FIG. 14, the AR image and the ID image are displayed only in the sight line region E1 in the case of the third embodiment. For example, the AR images a1, a2, and a3 are displayed because the display positions thereof fall within the range of the sight line region E1, and the ID images "1", "2", and "3" are displayed. Since the display positions of the AR images a4, a5, a11, a12, and a13 are outside the sight line region E1, they are not displayed and the ID images are not displayed, either. When the sight line region E1 moves and the display position falls within the corresponding state, the AR image and the ID image are displayed.

[Effect (3)]

According to the third embodiment, since the number of AR images and ID images displayed on the display screen 2 is suppressed in accordance with the sight line, the user can perform the operation while paying attention to only the AR image and the ID image in the sight line region, which makes the selection operation easier. In the third embodiment, it is not necessary to display all the AR images on the display screen 2, and it is possible to achieve the improvement in the processing efficiency.

Fourth Embodiment

A video display apparatus according to the fourth embodiment of the present invention will be described with reference to FIG. 28A and FIG. 28B. The HMD of the fourth embodiment continues to display the ID image when the AR image in the sight line region moves and comes out.

[Display Example]

Figure 28A:
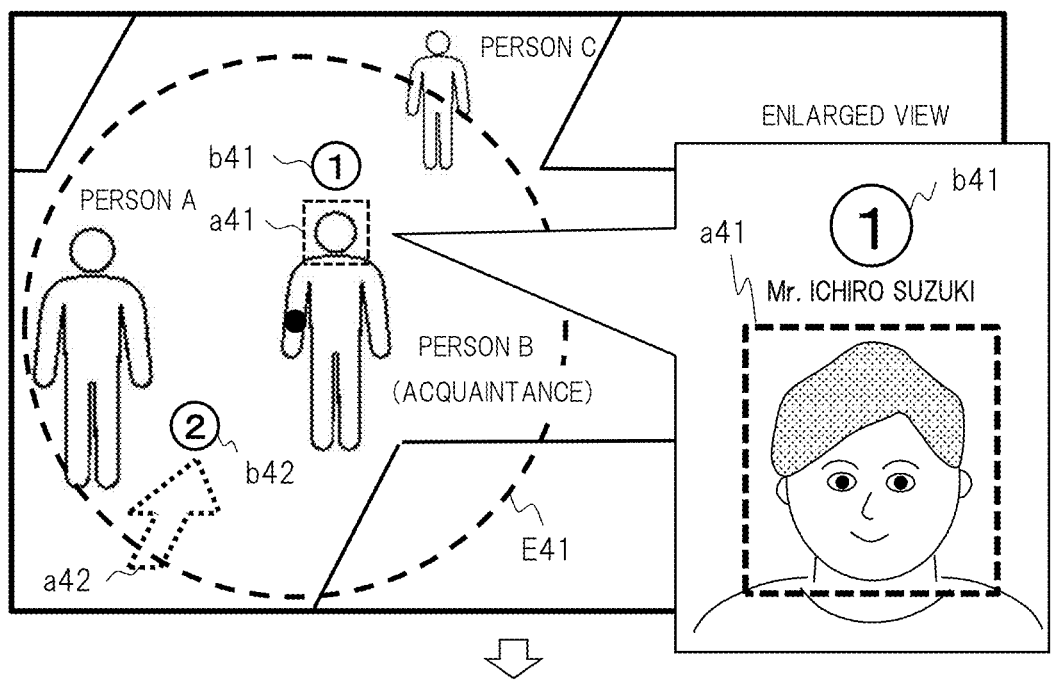
FIG. 28A and FIG. 28B are diagrams showing an example of a video in a video display apparatus according to the fourth embodiment of the present invention.
Figure 28B:
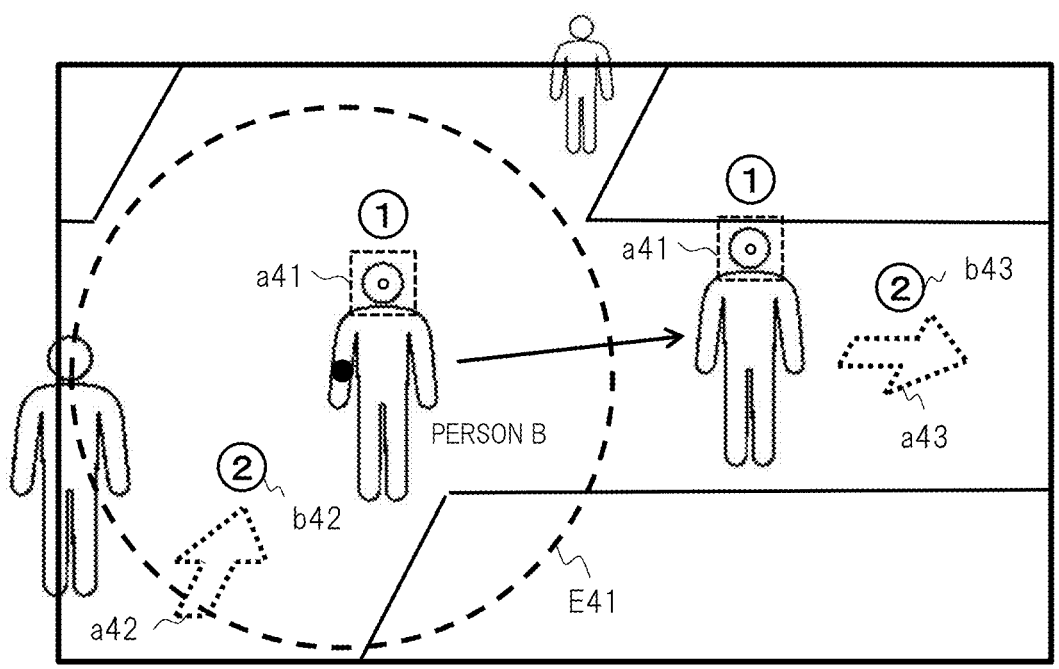

FIG. 28A and FIG. 28B shows an example of a video according to the fourth embodiment. In FIG. 28A, shows the first state, and FIG. 28B shows the second state. The real image of FIG. 28A and FIG. 28B is an example showing the state near an intersection. In this example, a person is treated as a target for displaying an AR image. A certain AR application detects a person's face and provides the information of the person as an AR image. There are three people, for example, a person A, a person B, and a person C on the display screen 2 of the video of FIG. 28A. It is assumed that the person A and the person C are ordinary people that the user does not know, and the person B is a person that the user knows. In the AR application, the faces and information of people acquainted with the user, including the person B, are registered in advance.

The AR application extracts a human face region from the image of the camera 5 by the known image processing. For example, the face regions of the person A, the person B, and the person C are extracted respectively. The AR application recognizes and determines the face of a specific person (for example, person B) based on image processing such as the feature identification. In other words, the AR application performs personal identification processing. At that time, for example, the registration information of the face image of the person B is used. When the AR application detects the face of the person B, for example, the AR application displays an AR image for the face region of the person B. This AR image is an image indicating that the person is a specific person (for example, person B) such as an acquaintance of the user. In this example, this AR image is a frame image surrounding the face region like an AR image a41. The AR image is not limited to this, and may be a frame image surrounding the body, a balloon image, a mark corresponding to a person, or the like.

In FIG. 28A and FIG. 28B, the vicinity of the face of the person B is illustrated in an enlarged manner for the sake of description. In this enlarged view, there is a frame image as the AR image a41 around the face of the person B. Further, the AR image a41 may be accompanied by a character image of information such as the name of the person B. Further, the AR application may display the registered information of the person B when the AR image a41 is selected and executed. Alternatively, the AR application may display the information of the person B in a large size by using a balloon image or the like when the AR image a41 is selected and executed.

Also, in this example, an AR image a42 is displayed in the video of FIG. 28A and FIG. 28B as an example of the AR image by another AR application. The AR image a42 is an arrow image for navigation such as route guidance. The AR image a42 indicates the direction in which the user should proceed.

The HMD 1 of the third embodiment assigns and displays an ID image b41 and an ID image b42 so as to be associated with the AR image a41 and the AR image a42 contained in a sight line region E41. For example, the ID image b41 has an ID "1", and the ID image b42 has an ID "2".

It is assumed that time has passed, for example, the person B has moved from the first state of (A) to the second state of (B). It is assumed that the sight line region E41 is almost at the same position. If the basic control of the first embodiment is applied, it will be as follows. In the second state of (B), the AR image a41 comes out of the sight line region E41, and thus "1" of the ID image b41 is hidden. In this case, it is not possible to perform the operation to select the ID image b41. For example, when tracking the AR image a41 of the person B, the user moves the sight line to move the sight line region and captures the AR image a41 of the moving person. In this case, since the ID image b41 of the AR image a41 of the person B is also displayed, it is possible to perform the operation to select the ID image b41. However, for example, when there are a plurality of objects or AR images in the sight line region and each of them moves, or when paying attention to a part of the AR images, a part of the AR images like the person B may move to the outside of the sight line region and the user cannot track it in some cases.

On the other hand, in the HMD 1 of the fourth embodiment, the ID "1" of the ID image b41 is continuously displayed even for the AR image a41 that has come out of the sight line region E41 in this second state. In this case, the display of the AR image a41 and the ID image b41 of the person B is continued even if the user does not move the sight line. As long as the person B is present on the display screen 2, the user can track the AR image a41 and the ID image b41, and can perform the operation to select the ID image b41.

Note that the control of the fourth embodiment can be set in advance by the user setting or the like so as to be applied to the case of a specific AR application or the case of a specific type of the AR image. Alternatively, this control may be switched to the applied state when the user performs a predetermined operation (for example, an "ID tracking" command). Further, by combining with the second embodiment, the ID image of the AR image to be tracked may be displayed in the selection region.

As another example, the AR image a42 of the arrow is as follows. A certain AR application sequentially displays a plurality of AR images such as the AR image a42 and AR image a43 for the navigation to a destination. For example, the AR image a42 is displayed at an initial time point, and the AR image a43 is displayed at a next time point. A method in which a plurality of AR images are automatically displayed in sequence may be used, or a method in which the next AR image a43 is displayed when the user selects the first AR image a42 may be used. In this manner, a plurality of related AR images are displayed at different positions in some cases. In that case, at least a part of the AR images may come out of the sight line region 20. For example, the AR image a43 is outside the sight line region E41.

In such a case, the HMD 1 displays the ID image even for the AR image that comes out of the sight line region, among the plurality of related AR images. For example, the ID image b42 is displayed for the AR image a42, and the ID image b43 is displayed for the AR image a43. In this example, the ID of the ID image b43 is set to "2", which is the same as the ID of the ID image b42. The same is true when there are three or more related AR images.

[Effect (4)]

According to the fourth embodiment, the display of the ID image can be continued in accordance with the movement of the object, the AR image, and the ID image, and thus the user can track even the AR image that has come out of the sight line region and can perform the operation for it. Note that the control of the fourth embodiment can be applied also to the case other than the case where the object moves. For example, it can be applied to the case where the object and the AR image are stationary and the sight line region moves.

Fifth Embodiment

A video display apparatus according to the fifth embodiment of the present invention will be described with reference to FIG. 29A and FIG. 29B. The HMD of the fifth embodiment realizes the control of the ID image by the use of the sight line depth of the sight line of the user.

[Sight Line Depth]

Figure 29A:
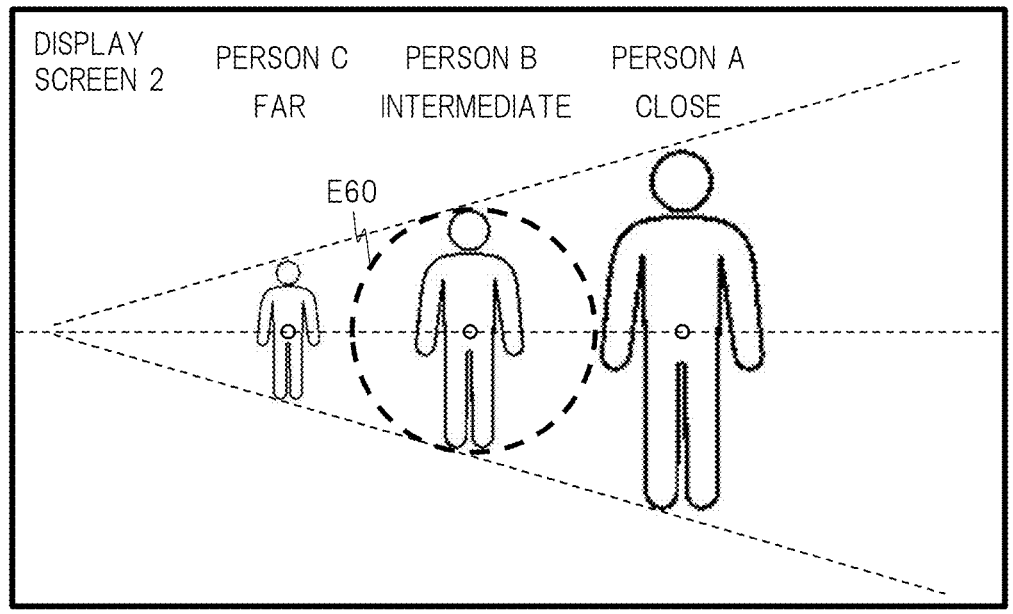
FIG. 29A and FIG. 29B are diagrams showing a sight line depth in a video display apparatus according to the fifth embodiment of the present invention.
Figure 29B:
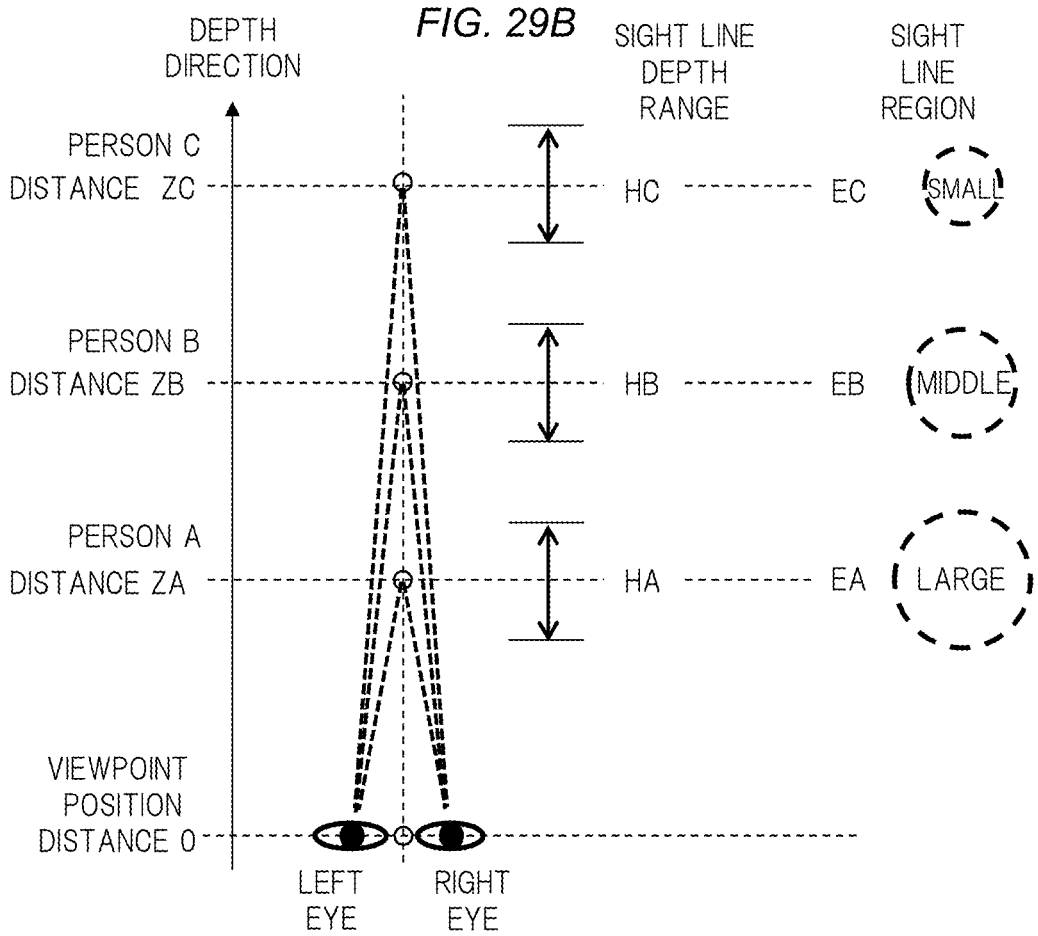

FIG. 29A and FIG. 29B schematically shows the concept of the sight line depth in the fifth embodiment. In FIG. 29A, shows an example of the size in accordance with the position of an object (for example, a person) in a real image. Also, FIG. 29B shows the sight line depth range in accordance with the position of the object in the depth direction from the position of the user's eyes (=viewpoint position). The sight line detector 4 of the HMD 1 of the fifth embodiment has a function of detecting the sight line depth. The sight line detector 4 detects each of the sight line direction of the left eye and the sight line direction of the right eye as the sight line directions of both eyes of the user. The sight line detector 4 can detect the sight line depth from the point where the sight line direction of the left eye and the sight line direction of the right eye intersect.

When respective objects are present at different positions in the depth direction when viewed from the user as in the example of FIG. 28A and FIG. 28B described above, the sizes of the respective objects are different as in the example of the video of in FIG. 29A. In the video of FIG. 29A, among three people (person A, person B, person C), the person A is relatively close to the HMD 1 and has a shallow sight line depth. The person C is relatively far from the HMD 1 and has a deep sight line depth, and the person B is at an intermediate distance between the person A and the person C, and has an intermediate sight line depth between them.

In (B), the sight line directions from the left and right eyes of the user are indicated by broken lines. The point where the two sight line directions intersect corresponds to the sight line depth. The sight line depth range is a range of effective sight line depth. In (B), the vertical axis represents the distance between the HMD 1 and the target person, and has a distance ZA from the person A, a distance ZB from the person B, and a distance ZC from the person C. The sight line depth ranges HA, HB, and HC are shown as the sight line depth ranges in accordance with the distance. The HMD 1 sets the sight line region 20 so as to correspond to the detected sight line direction and sight line depth range. For example, when the detected sight line depth range is the sight line depth range HB, the sight line region E60 is set in the video of (A). In this case, for example, the operation to select the ID image of the AR image associated with the person B can be easily performed.

[Control Example]

As a control example in the fifth embodiment, the HMD 1 may automatically adjust the size or the like of the sight line region in accordance with the sight line depth. On the right side of the sight line depth range in FIG. 29A and FIG. 29B, the control example of the size of the sight line region in this control example is shown. For example, the HMD 1 sets the size (for example, radius) of the sight line region to a level selected from the three levels of large, medium, and small in accordance with the determination of the sight line depth from the three levels of deep, intermediate, and shallow. In this control example, a sight line region having a suitable size is set in accordance with the sight line direction of the user and the state of the sight line depth. The AR image and the ID image in the sight line region are determined in accordance with the size of the sight line region. Even if the sight line direction of the user is the same, the sight line regions having different sizes are set in accordance with the difference in the sight line depth. As a result, the ID images to be the targets of selection vary. For example, in the video of FIG. 14, it is assumed that the base positions of the AR image a2 and the AR image a4 are at the deeper positions in the depth direction as compared with the AR image a1. In the case where the user pays attention to the AR image a2 and the like, the sight line depth becomes deeper as compared with the case where the user pays attention to the AR image a1. Correspondingly, the HMD 1 sets the sight line region 20 with a smaller size. Consequently, the AR images that are contained in the sight line region 20 are further narrowed down. As a result, the number of ID images to be displayed is reduced, and the operation to select the ID image can be performed in a well narrowed-down state.

[Effect (5)]

According to the fifth embodiment, since the sight line state in the depth direction in the three-dimensional space is also taken into account as the sight line depth, the sight line region and the ID image can be controlled in more detail. For example, the user can easily narrow down the ID image to be selected in accordance with the attention of the sight line.

Sixth Embodiment

A video display apparatus according to the sixth embodiment of the present invention will be described with reference to FIG. 30A and FIG. 30B. In the HMD of the sixth embodiment, as a control example related to a specific AR application, a predetermined function is realized by performing the operation to select a plurality of AR images associated with an object by the use of a plurality of ID images.

[Display Example (1)]

Figure 30A:
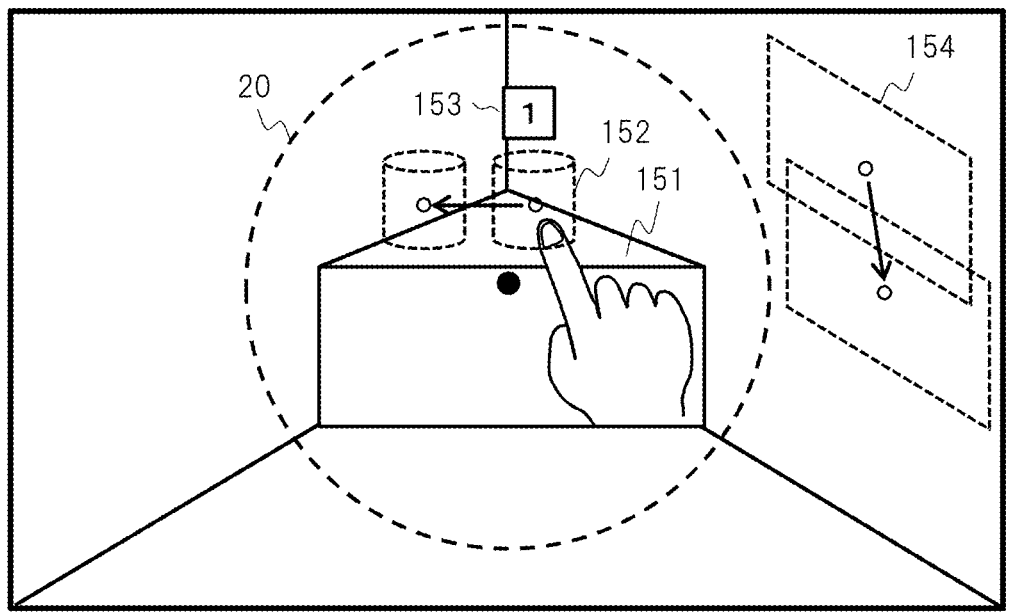
FIG. 30A and FIG. 30B are diagrams showing an example of a video in a video display apparatus according to the sixth embodiment of the present invention.
Figure 30B:
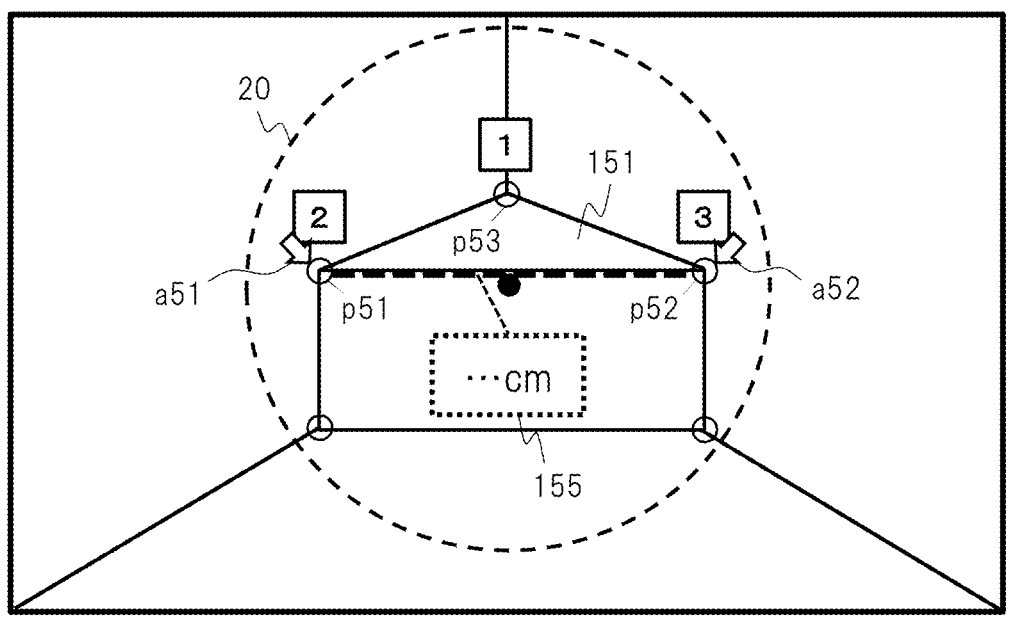

FIG. 30A and FIG. 30B shows an example of a video in the sixth embodiment. In this real image, there is a triangular table as an object 151 at a corner of a room. The HMD 1 of the fifth embodiment grasps the position of the HMD 1 in the room by the use of the sensor unit 150. The HMD 1 measures the distance between the HMD 1 and the wall or floor and the distance between the HMD 1 and the object 151 by the use of, for example, the camera 5 or the distance sensor of the sensor unit 150. The HMD 1 grasps the three-dimensional positions of various objects in the room and grasps the positional relationship with the HMD 1. As the distance sensor, known methods such as the TOF (Time Of Flight) method, the pattern irradiation method using a laser, and the calculation method using a plurality of cameras can be applied.

In the HMD 1 of the fifth embodiment, for example, a certain AR application uses a camera 5 to capture a space such as the inside of a room and generates the AR image by the use of the captured video. This AR application is, for example, an application having a function of virtually arranging an object (corresponding AR object) in a room in accordance with the operation of the user, and can be used for, for example, the simulation of an interior layout.

For example, the HMD 1 arranges and displays an AR object 152 designated by the user on the object 151 of the triangular table in the sight line region 20. The AR object 152 is, for example, an AR image representing a cylindrical object. The AR object 152 can be various images such as a vase and a model in accordance with the designation of the AR application and the user. The HMD 1 assigns and displays an ID image 153 to the AR object 152 when it falls within the range of the sight line region 20.

In addition, the AR application moves and displays the AR object 152 in accordance with a predetermined operation (for example, a gesture) of the user. Namely, the user can arrange the AR object 152 at a desired position. The HMD 1 also moves the corresponding ID image 153 in accordance with the movement of the AR object 152. As another example, an AR object 154 is an example in which a rectangular image representing a painting, a window, or the like is arranged on a wall.

For example, when an operation to select the ID image 153 of the AR object 152 is performed, the HMD 1 executes a predetermined process associated with the AR object 152. As this process, for example, various processes such as putting the AR object 152 into the selected state and ON/OFF of the display of the AR object 152 can be performed. For example, there is a case in which the operation to move the AR object 152 by the gesture of a direct touch or slide is difficult. In this case, the user selects the ID image 153 by audio input to put the AR object 152 into the selected state. Then, the user can move the AR object 152 by using a predetermined command provided by the AR application (for example, a command such as "move right" or "move left").

[Display Example (2)]

FIG. 30B shows another example of the video. The AR application of the HMD 1 can assign and display a plurality of AR objects to one object 151 of a triangular table or the like. A certain AR application has a function of measuring the length of an object. The HMD 1 detects edges and feature points of the object 151 based on the image recognition of the camera 5. By this means, for example, a point p51 at the left corner, a point p52 at the right corner, and a point p53 at the back of the upper surface of the object 151 can be detected. For example, the HMD 1 displays AR objects a51 and a52 to the points p51 and p52 at the two left and right corners. The AR object a51 is an arrow image representing the left corner point and the AR object a52 is an arrow image representing the right corner point. Then, the HMD 1 assigns and displays an ID image to each of the AR objects a51 and a52. For example, the ID image "2" as the ID image b51 is displayed for the AR object a51, and the ID image "3" as the ID image b52 is displayed for the AR object a52.

The user can select a plurality of AR objects by the operation to select the ID image in the sight line region 20. In this example, the user measures the length between two points of the object 151 by the use of the measurement function of this AR application. For the measurement, the user performs the operation to select the two ID images b51 and b52 corresponding to the two points. The operation is, for example, to input an "ID 2 selection" command and an "ID 3 selection" command. Consequently, the two ID images b51 and b52 can be put into the selected state. When a plurality of AR images are put into the selected state, the AR application grasps the relationship between these AR images and executes a predetermined process for the plurality of AR images based on the relationship. In this example, the AR application calculates the distance between the point p51 and the point p52 in the selected state (the length of a straight line between the two points). The AR application may display an AR image of the straight line between the two points. The AR application displays the information of the calculated distance as, for example, an AR image 155. Similarly, the AR application can also measure the area of the region formed by three points in accordance with the designation of the three points of the object.

[Effect (6)]

According to the sixth embodiment, it is possible to effectively support the operation input of the AR application that handles a plurality of AR images as in the above example. Even when the AR image is small or when detailed operations are required, the operation using the ID image is possible.

Seventh Embodiment

A video display apparatus according to the seventh embodiment of the present invention will be described with reference to FIG. 31A and FIG. 31B. In the seventh embodiment, in a specific AR application, an ID image is directly assigned and displayed to a real image object to enable a virtual operation of the object.

Figure 31A:
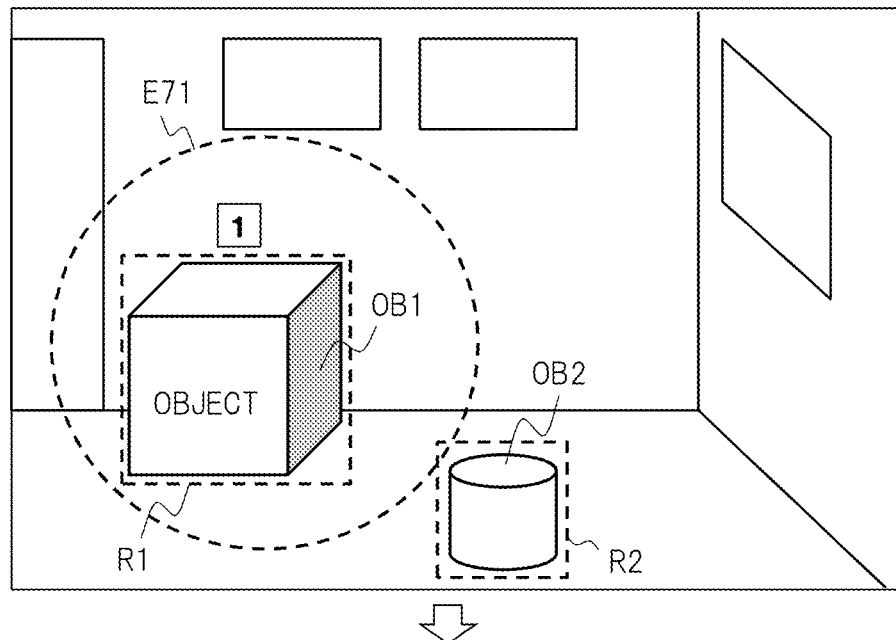
FIG. 31A and FIG. 31B are diagrams showing an example of a video in a video display apparatus according to the seventh embodiment of the present invention.
Figure 31B:
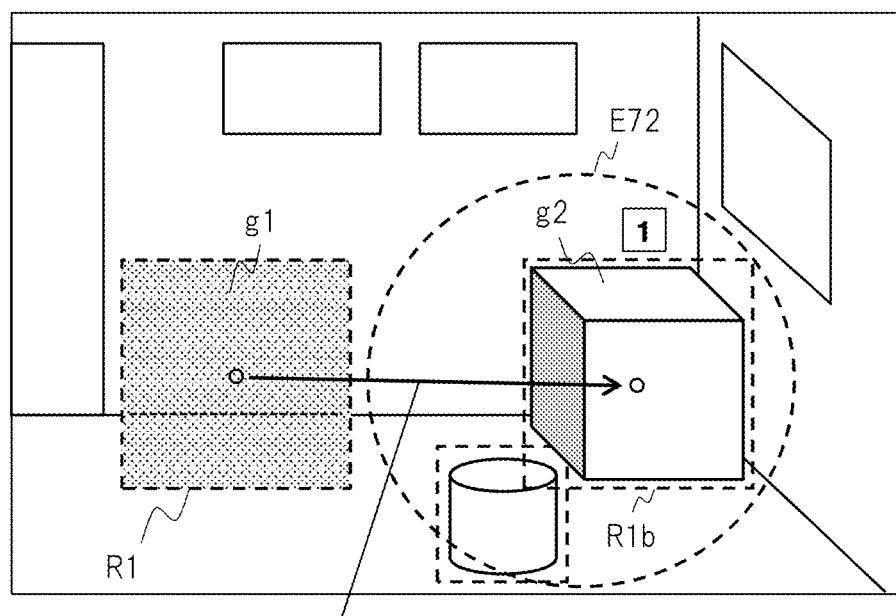

FIG. 31A and FIG. 31B shows an example of the video in the seventh embodiment. This real image shows an inside of a room, and there are a plurality of (for example, two) objects OB1 and OB2 such as a chair and a table. The HMD 1 distinctively detects image regions R1 and R2 of the plurality of objects OB1 and OB2 on the display screen 2 based on the recognition of the image of the camera 5. The HMD 1 determines an object image region contained in the sight line region 20, and assigns and displays an ID image to the object image region contained in the sight line region 20. For example, the ID image "1" is assigned and displayed to the region R1 of the object OB1.

The user performs the operation to select a desired ID image corresponding to a desired object. For example, a command for selecting the ID image "1" associated with the object OB1 is input by audio. The HMD 1 puts the object image region of the object associated with the selected ID image into the selected state. The corresponding AR application executes a predetermined process related to the object image region of the object in the selected state. The process example of the AR application is as follows.

The AR application of the first example searches and acquires information about the object from the selected object image region by means of, for example, the Internet. The AR application displays the acquired information as an AR image on the display screen 2. For example, when the object is a product, the information of the product can be displayed.

The AR application of the second example is another example of the application that simulates the layout inside the room, as in the fifth embodiment. This AR application virtually moves the selected object image region in accordance with a predetermined operation of the user. The predetermined operation may be, for example, a gesture of sliding a finger or an audio command to instruct the movement of the object. At the time of this movement, the program displays an image of a fill or the like so as to be superimposed on the object image region of the real image, thereby making the object invisible or displaying an expression capable of understanding the movement source of the object. The AR application displays the object image region so as to follow the movement thereof. In this manner, the user virtually sees as if the object has been moved. Therefore, the user can simulate the arrangement of the objects.

FIG. 31A shows the state before the virtual movement of the object OB1, and FIG. 31B shows the state after the virtual movement of the object OB1. The user is moving the object image region of the object OB1 of FIG. 31A to the right. The sight line region is also moving to the right. In the state before the movement, the AR application assigns and displays the ID image "1" to the object OB1 in a sight line region E71. The AR application may display a frame image representing the region R1 as an AR image. The user performs the operation to select the ID image "1" associated with the object OB1, and virtually moves the object OB1 to the right by a predetermined operation. After the movement, the HMD 1 displays a filled image g1 indicative that the object OB1 is no longer present, to the region R1 of the object OB1 before the movement. Regarding the filled image g1, it is more preferable to perform image processing to virtually show the background by using the surrounding image. The HMD 1 displays an image g2 representing the object OB1 in a region R1b after the movement. The image g2 is a kind of AR image, and is an AR image corresponding to the image region of the object. The HMD 1 maintains the display of the ID image "1" for the image g2. The image g2 of the region R1b after the movement may be the same as the image of the object OB1 before the movement, and it is more preferable to use an image in which the orientation, size, etc. of the object are adjusted by image processing.

[Effect (7)]

According to the seventh embodiment, it is possible to virtually perform an operation for a real image object by the use of an ID image.

Additional Notes (1) The video display apparatus automatically enlarges or reduces the sight line region in accordance with the number or density of generated images in the sight line region.

(2) The video display apparatus maintains the ID image including the same identification information as much as possible for the same generated image in time series.

(3) The video display apparatus reassigns the ID image including identification information for the generated image in the sight line region at each time point in accordance with a predetermined rule.

(4) The video display apparatus displays the ID images in a non-dense state when a plurality of generated images are densely arranged.

(5) When a plurality of generated images form a group, the video display apparatus assigns and displays an ID image for each group, and selects the plurality of generated images in the group in accordance with the operation to select the ID image for the group.

In the foregoing, the present invention has been specifically described based the embodiments, but the present invention is not limited to the embodiments described above and can be variously modified within the range not departing from the gist thereof. Also, the configuration by the combination of the embodiments and the configuration obtained by addition, deletion, or replacement of the components of each embodiment are also possible. As the video display apparatus of the embodiment, the case where the present invention is applied to the HMD has been described, but the present invention is not limited to this, and can be applied to any apparatus as long as it has a function of displaying the generated image so as to be superimposed on the real image. For example, the present invention can also be applied to the HUD apparatus and the like. The program processing and information processing described in the embodiments may be implemented by general-purpose software program processing, or may be implemented by a dedicated hardware circuit such as FPGA or ASIC. The program data may be stored in a computer-readable storage medium such as a disk or a memory card. The program may be stored at the time of product shipment, or may be stored in a server, DB, or the like on the communication network. The data structure is not limited to the table structure and any structure can be applied. The above-mentioned identification information (ID) can be replaced with a similar expression such as an identifier.

REFERENCE SIGNS LIST

1 . . . HMD, 2 . . . display screen, 3 . . . speaker, 4 . . . sight line detector, 5 . . . camera

The invention claimed is:

1. A video display apparatus, comprising:
a display configured to display a generated image;
processing circuitry configured to set a selection region to support a user operation in relation to the generated image; and
a sight line detector configured to detect a direction of a user's line of sight,
wherein the processing circuitry is configured to set a sight line region in accordance with the detected direction of the user's line of sight,
wherein, when the generated image is in the sight line region, the display is configured to display a selection image related to the generated image in the selection region, and
wherein the processing circuitry is configured to perform a predetermined process related to the selection image in response to the user operation selecting the selection image.

2. The video display apparatus according to claim 1, wherein the selection image is a reduced image of the generated image.

3. The video display apparatus according to claim 1, wherein the selection image is a part of the generated image.

4. The video display apparatus according to claim 2,
wherein the display displays an ID image,
wherein the ID image includes identification information for supporting the user operation in relation to the generated image, and
wherein, when the generated image is in the sight line region, the display is configured to display the generated image and the selection image related to the ID image.

5. The video display apparatus according to claim 4, wherein the processing circuitry is configured to control the sight line region in accordance with the user operation.

6. The video display apparatus according to claim 4, wherein the processing circuitry is configured to:
set a maximum number of ID images to simultaneously display in the sight line region; and
control the sight line region in accordance with the maximum number.

7. The video display apparatus according to claim 4, wherein the display is configured to display the selection region on an upper side, a lower side, a right side, or a left side in a display area.

\* \* \* \* \*